(12) United States Patent
Indermuhle et al.

(10) Patent No.: US 6,720,157 B2
(45) Date of Patent: *Apr. 13, 2004

(54) CHIPS HAVING ELEVATED SAMPLE SURFACES

(75) Inventors: Pierre F. Indermuhle, Hayward, CA (US); Frank G. Zaugg, Belmont, CA (US); Peter Wagner, Belmont, CA (US); Steffen Nock, Redwood City, CA (US)

(73) Assignee: Zyomyx, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/792,335

(22) Filed: Feb. 23, 2001

(65) Prior Publication Data

US 2001/0036674 A1 Nov. 1, 2001

Related U.S. Application Data

(60) Provisional application No. 60/184,381, filed on Feb. 23, 2000, and provisional application No. 60/225,999, filed on Aug. 16, 2000.

(51) Int. Cl.⁷ ................................................. G01N 33/53
(52) U.S. Cl. ..................................... 435/7.1; 435/287.3
(58) Field of Search ........................... 436/94, 86, 161, 436/171; 435/7.1, 287.3; 422/70, 100, 102

(56) References Cited

U.S. PATENT DOCUMENTS

| | | |
|---|---|---|
| 4,110,167 A * | 8/1978 | Melnyk ................... 435/309.1 |
| 5,552,270 A | 9/1996 | Khrapko et al. |
| 5,741,700 A | 4/1998 | Ershov et al. |
| 5,756,050 A | 5/1998 | Ershow et al. |
| 5,770,721 A | 6/1998 | Ershov et al. |
| 5,872,010 A | 2/1999 | Karger et al. |
| 5,962,329 A | 10/1999 | Ershov et al. |
| 6,368,871 B1 * | 4/2002 | Christel et al. ............. 436/180 |

FOREIGN PATENT DOCUMENTS

EP  0 874 242 A1  10/1998

OTHER PUBLICATIONS

Turner, et al "Attachment of astroglial cells to microfabricated pillar arrays of different geometries" Journal of Biomedical Materials Research 2000, 51(3), 430–441.*

U.S. patent application Ser. No. 09/792,488, Jedrzejewski et al., filed Feb. 23, 2001.

* cited by examiner

*Primary Examiner*—Bennett Celsa
*Assistant Examiner*—Jon D Epperson
(74) *Attorney, Agent, or Firm*—Townsend and Townsend and Crew LLP

(57) ABSTRACT

A chip is disclosed. The chip includes a base including a non-sample surface and at least one structure includes a pillar. Each structure includes a sample surface that is elevated with respect to the non-sample surface and each structure may be adapted to receive a sample.

19 Claims, 23 Drawing Sheets

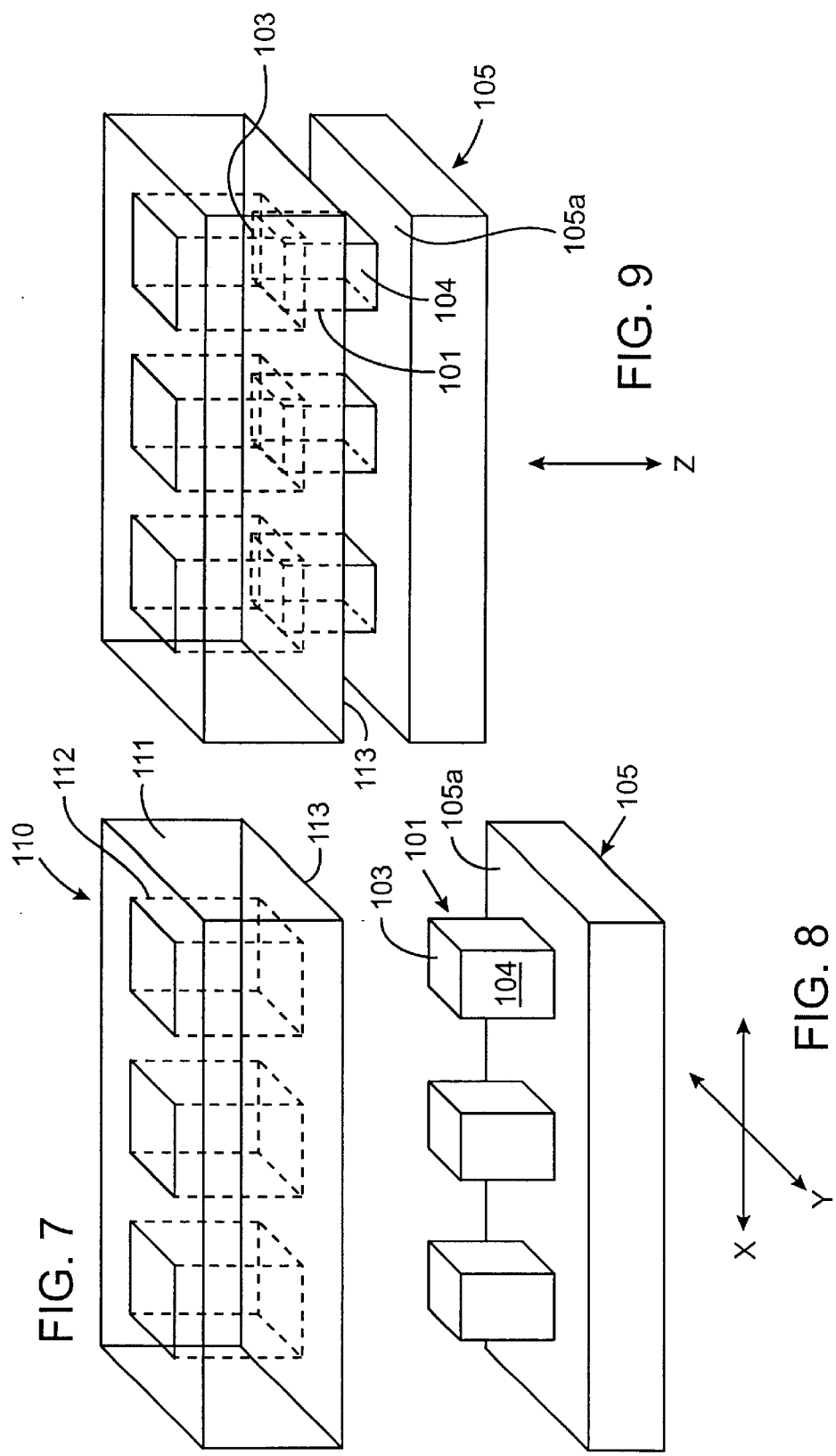

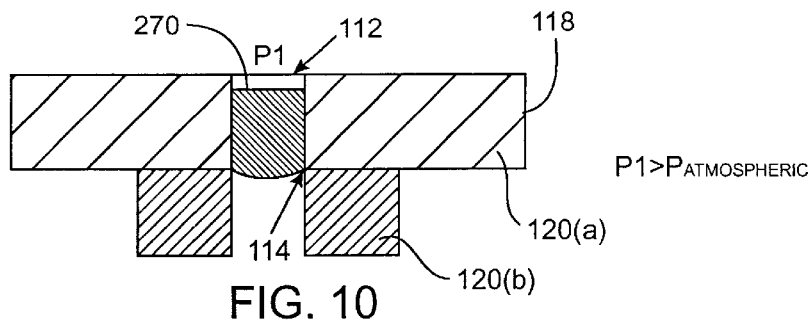
FIG. 10
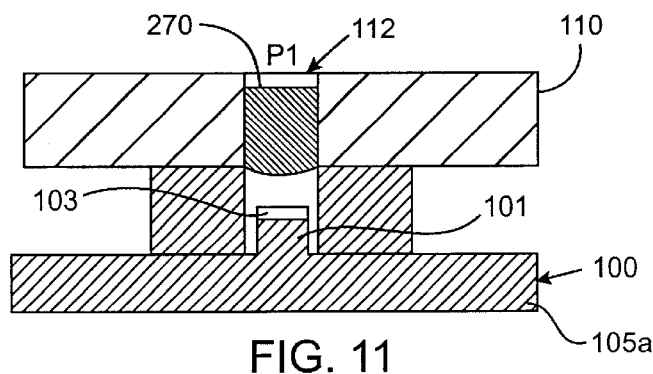
FIG. 11
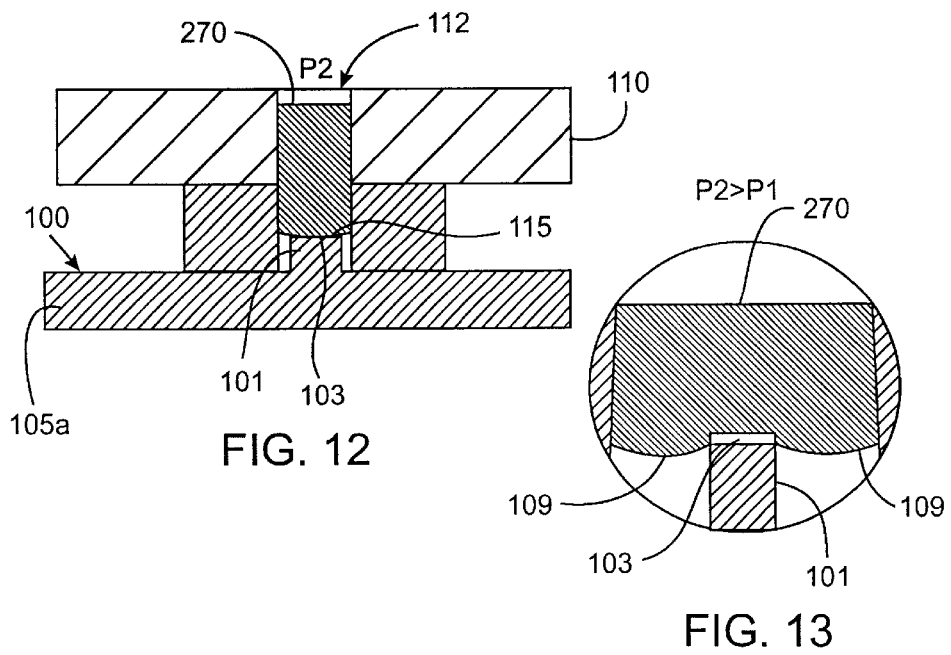
FIG. 12
FIG. 13

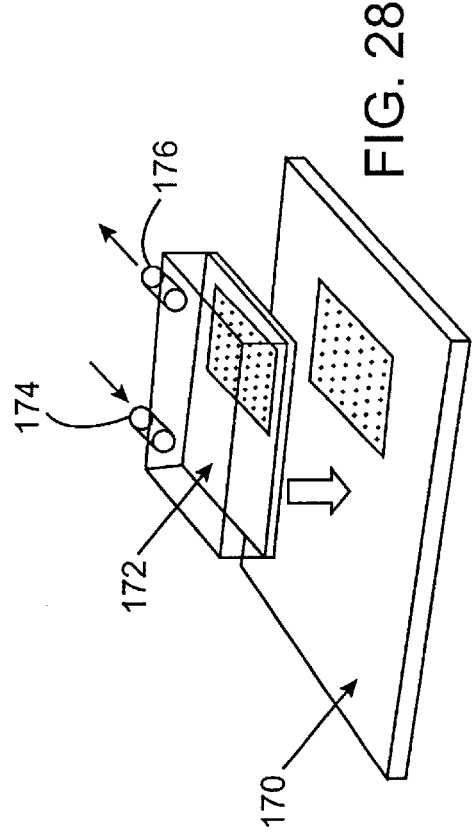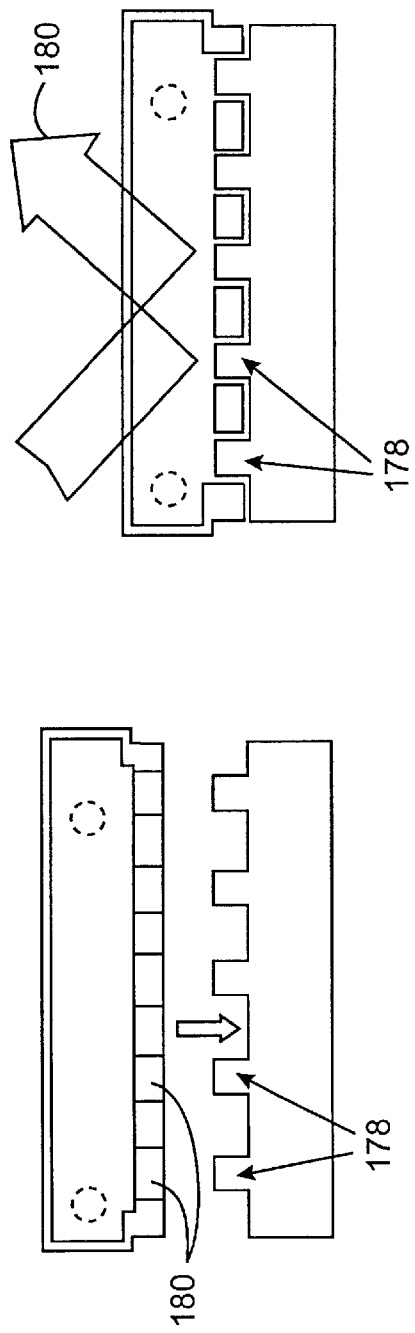

CHIPS HAVING ELEVATED SAMPLE SURFACES

CROSS-REFERENCE TO RELATED APPLICATIONS

This application claims the benefit of U.S. provisional patent application Nos. 60/184,381 filed Feb. 23, 2000 and 60/225,999 filed Aug. 16, 2000. This application is also being filed on the same day as U.S. non-provisional application No. 09/192,488 entitled "Microfluidic Devices and Methods" by Paul Jedrzjewski et al., now U.S. Pat. No. 6,454,924. All of the above provisional and non-provisional patent applications are herein incorporated by reference in their entirety for all purposes and are all assigned to the seine assignee as the present application.

BACKGROUND OF THE INVENTION

In the discovery of new drugs, potential drug candidates are generated by identifying chemical compounds with desirable properties. These compounds are sometimes referred to as "lead compounds". Once a lead compound is discovered, variants of the lead compound can be created and evaluated as potential drug candidates.

In order to reduce the time associated with discovering useful drug candidates, high throughput screening (HTS) methods are replacing conventional lead compound identification methods. High throughput screening methods use libraries containing large numbers of potentially desirable compounds. The compounds in the library are numerous and may be made by combinatorial chemistry processes. In a HTS process, the compounds are screened in one or more assays to identify those library members (particular chemical species or subclasses) that display a desired characteristic activity. The compounds thus identified can serve as conventional "lead compounds" or they can be therapeutic.

Conventional HTS processes use multi-well plates having many wells. For example, a typical multi-well plate may have 96 wells. Each of the wells may contain a different liquid sample to be analyzed. Using a multi-well plate, a number of different liquid samples may be analyzed substantially simultaneously.

FIG. 1 shows a portion of a multi-well plate 10 having a base 17 and a rim 15. The rim 15 extends upward from the base 17 to define a well 16. A micropipette 11 is above the well 16 and dispenses a droplet comprising a liquid sample 13 into the well 16 and onto a sample surface 12. The droplet may have a surface "S". While in the well 16, the rim 15 confines the liquid sample 13 to the sample surface 12 so that it may be analyzed.

It is desirable to reduce the volume of the wells in a multi-well plate to increase the density of the wells on the plate. By doing so, more wells can be present on the plate and more reactions can be analyzed substantially simultaneously. Also, as the volumes of the wells are reduced, the liquid sample volumes are reduced. Reducing the liquid sample volumes reduces the amount of reagents needed in the HTS process. By reducing the amount of reagents used, the costs of the HTS process can be reduced. Also, liquid samples such as samples of biological fluids (e.g., blood) are not always easy to obtain. It is desirable to minimize the amount of sample in an assay in the event that little sample is available.

While it is desirable to increase the density of the wells in a multi-well plate, the density of the wells is limited by the presence of the rims on the wells. The rims could be removed to permit the sample surfaces to be closer together and thus increase the density of the sample surfaces. However, by removing the rims, no physical barrier would be present between adjacent sample surfaces. This increases the likelihood that liquid samples on adjacent sample surfaces could intermix and contaminate each other.

Also, reducing the liquid sample volumes can be problematic. Decreasing the size of assays to volumes smaller than 1 microliter substantially increases the surface-to-volume ratio. Increasing the surface-to-volume ratio increases the likelihood that analytes or capture agents in the liquid sample will be altered, thus affecting any analysis or reaction using the analyte or capture agents. For example, proteins in a liquid sample are prone to denature at liquid/solid and liquid/air interfaces. When a liquid sample containing proteins is formed into a droplet, the droplet can have a high surface area relative to the amount of proteins in the droplet. If the proteins in the liquid sample come into contact with the liquid/air interface, the proteins may denature and become inactive. Furthermore, when the surface-to-volume ratio of a liquid sample increases, the likelihood that the liquid sample will evaporate also increases. Liquids with submicroliter volumes tend to evaporate rapidly when in contact with air. For example, many submicroliter volumes of liquid can evaporate within seconds to a few minutes. This makes it difficult to analyze or process such liquids. In addition, if the liquid samples contain proteins, the evaporation of the liquid components of the liquid samples can adversely affect (e.g., denature) the proteins.

Embodiments of the invention address these and other problems.

SUMMARY OF THE INVENTION

One embodiment of the invention is directed to a chip comprising: a) a base including a non-sample surface; and b) at least one structure, each structure comprising a pillar and a sample surface that is elevated with respect to the non-sample surface and is adapted to receive a sample from a dispenser.

Another embodiment of the invention is directed to an assembly adapted to process fluids, the assembly comprising: a) a dispenser comprising a body and at least one fluid channel defined in the body, each fluid channel being adapted to dispense a fluid on one or more of the sample surfaces; and b) a chip comprising (i) a base including a non-sample surface, and (ii) at least one structure, each structure comprising a pillar and a sample surface that is elevated with respect to the non-sample surface and is adapted to receive the fluid from the dispenser.

Another embodiment of the invention is directed to a method of processing fluids, the method comprising: a) supplying a fluid in a fluid channel in a dispenser; and b) dispensing the fluid on one or more structures on a base of a chip, wherein each structure comprises a pillar and includes a sample surface that is elevated with respect to the non-sample surface.

Another embodiment of the invention is directed to a method of processing fluids, the method comprising: a) supplying a plurality of liquids to respective fluid channels in a dispenser, wherein each of the fluid channels includes a passive valve and wherein the flow of each liquid in each fluid channel stops at the passive valve; b) aligning sample surfaces of a plurality of structures with the plurality of fluid channels, wherein each structure comprises a pillar; and c) contacting the sample surfaces and the liquids in the fluid channels while the sample surfaces are in or are positioned at the ends of the fluid channels.

Another embodiment of the invention is directed to a chip comprising: a) a base including a non-sample surface; and b) a plurality of structures in an array on the base, each structure comprising a pillar and a sample surface that is elevated with respect to the non-sample surface and is adapted to receive a sample from a dispenser to be processed or analyzed while the sample is on the sample surface.

Another embodiment of the invention is directed to an assembly adapted to process fluids, the assembly comprising: a) a chip comprising: i) a base including a non-sample surface; and ii) a plurality of structures in an array on the base, each structure comprising a pillar and a sample surface that is elevated with respect to the non-sample surface and is adapted to receive a sample to be processed or analyzed while the sample is on the sample surface; and b) a dispenser including a plurality of fluid channels, each fluid channel including a passive valve, wherein the dispenser dispenses liquid samples on the sample surfaces of the chip.

These and other embodiments are described in greater detail below.

BRIEF DESCRIPTION OF THE DRAWINGS

FIG. 6(l) shows a cross-sectional view of a chip with pillars having fluid passages passing through them.

FIG. 7 shows a perspective view of a dispenser.

FIG. 8 shows a perspective view of a chip embodiment.

FIG. 9 shows a perspective view of an assembly embodiment.

FIGS. 10–12 shows cross-sectional views of assembly embodiments.

FIG. 13 is a close-up view of a liquid sample on a sample surface of a pillar.

FIG. 28 shows an exploded view of an assembly embodiment.

FIGS. 29 to 30 show partial cross-sectional views of the assembly embodiment shown in FIG. 28.

It is understood that the above Figures may be simplified or may have disproportionate features in some instances in order to illustrate embodiments of the invention. For example, although FIG. 2(a) shows a chip with two pillars, sample chips according to embodiments of the invention may have any suitable number of pillars. For example, in some embodiments, there may be more than 100 pillars per chip.

DETAILED DESCRIPTION

Figure 1A:
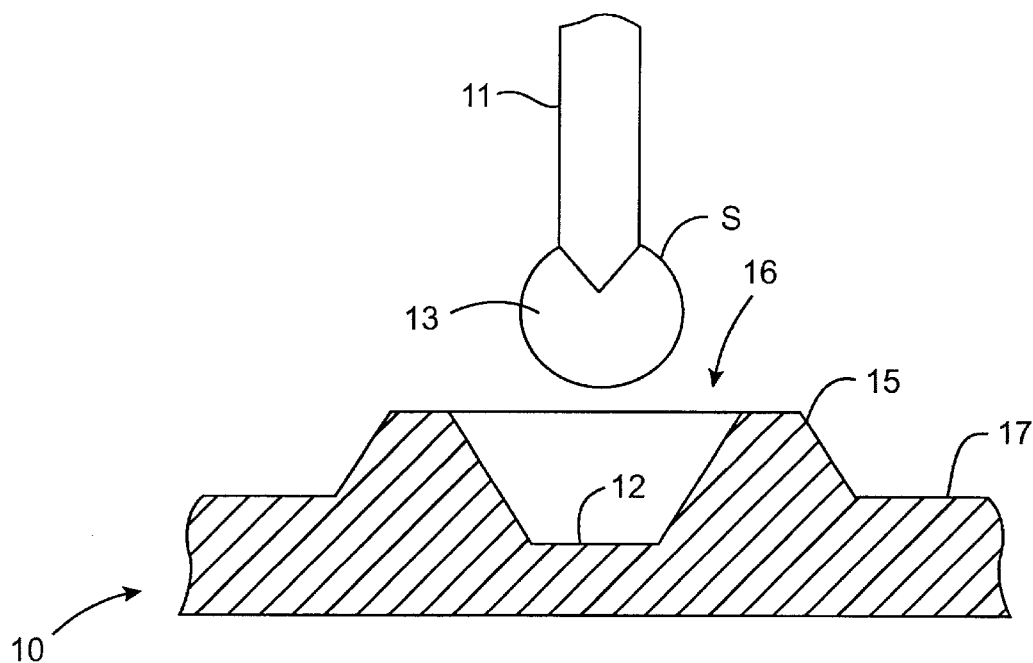
FIGS. 1(a)–1(b) show cross-sections of a micropipette and a micro-well plate.
Figure 1B:
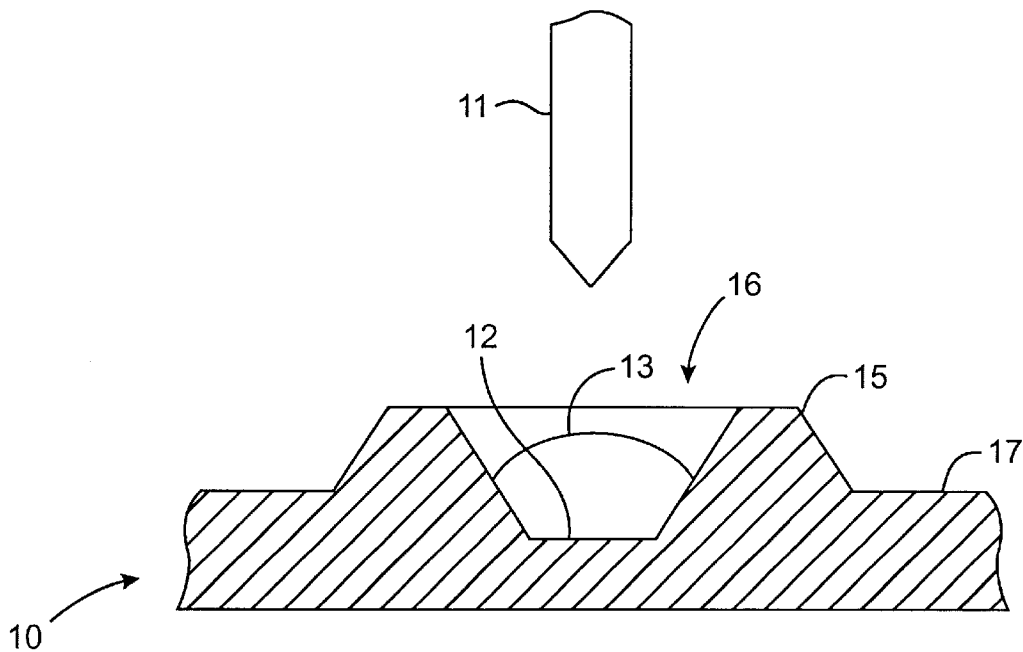

Embodiments of the invention may be used in any number of different fields. For example, embodiments of the invention may be used in pharmaceutical applications such as proteomic (or the like) studies for target discovery and/or validation as well as in diagnostics in a clinical setting for staging or disease progression. Also, embodiments of the invention may be used in environmental analyses for tracking and the identification of contaminants. In academic research environments, embodiments of the invention may be used in biological or medical research. Embodiments of the invention may also be used with research and clinical microarray systems and devices.

In embodiments of the invention, events such as binding, binding inhibition, reacting, or catalysis between two or more components can be analyzed. For example, the interaction between an analyte in a liquid sample and a capture agent bound to a surface on a pillar may be analyzed using embodiments of the invention. More specifically, interactions between the following components may be analyzed using embodiments of the invention: antibody/antigen, antibody/hapten, enzyme/substrate, carrier protein/ substrate, lectin/carbohydrate, receptor/hormone, receptor/ effector, protein/DNA, protein/RNA, repressor/inducer, DNA/DNA and the like.

I. Chips with Pillars

One embodiment of the invention is directed to a chip. The chip may comprise a base including a non-sample surface and at least one structure comprising a pillar. The at least one structure is typically in an array on the base of the chip. Each structure includes a sample surface that is elevated with respect to the non-sample surface of the chip. The sample surface of a structure may correspond to the top surface of the pillar. In other embodiments, the sample surface may correspond to an upper surface of a coating on the pillar.

Each sample surface may be adapted to receive a sample to be processed or analyzed while the sample is on the sample surface. The sample may be or include a component that is to be bound, adsorbed, absorbed, reacted, etc. on the sample surface. For example, the sample can be a liquid containing analytes and a liquid medium. In another example, the sample may be the analytes themselves. Because a number of sample surfaces are on each chip, many samples may be processed or analyzed in parallel in embodiments of the invention.

The samples can be in the form of liquids when they contact the sample surfaces. When liquid samples are on the sample surfaces, the liquid samples may be in the form of discrete deposits. Any suitable volume of liquid may be deposited on the sample surfaces. For example, the liquid samples that are deposited on the sample surfaces may be on the order of about 1 microliter or less. In other embodiments, the liquid samples on the sample surfaces may be on the order of about 10 nanoliters or less (e.g., 100 picoliters or less).

In yet other embodiments, discrete deposits of liquids need not be left on the sample surfaces. For example, a liquid containing a capture agent and a liquid medium may contact a sample surface. The capture agent may bind to the sample surface and substantially all of the liquid medium may be removed from the sample surface, leaving only the capture agent at the sample surface. Consequently, in some embodiments of the invention, liquid media need not be retained on the sample surfaces after liquid from a dispenser contacts the sample surface.

The liquid samples may be derived from biological fluids such as blood and urine. In some embodiments, the biological fluids may include organelles such as cells or molecules such as proteins and nucleic acid strands. When the chip is used to analyze, produce, or process a biological fluid or a biological molecule, the chip may be referred to as a "biochip".

The liquids provided by the dispenser may comprise any suitable liquid media and any suitable components. Suitable components may include analytes, capture agents (e.g., immobilized targets), and reactants. Suitable analytes or capture agents may be organic or inorganic in nature, and may be biological molecules such as polypeptides, DNA, RNA, mRNA, antibodies, antigens, etc. Other suitable analytes may be chemical compounds that may be potential candidate drugs. Reactants may include reagents that can react with other components on the sample surfaces. Suitable reagents may include biological or chemical entities that can process components at the sample surfaces. For instance, a reagent may be an enzyme or other substance that can unfold, cleave, or derivatize the proteins at the sample surface. Suitable liquid media include solutions such as buffers (e.g., acidic, neutral, basic), water, organic solvents, etc.

The elevated sample surfaces upon which the samples are present may have selected properties. In some embodiments, the sample surfaces may be rendered liquiphilic so that the sample surfaces are more likely to receive and retain liquid samples. For example, the sample surfaces may be hydrophilic. Alternatively or additionally, the sample surfaces may have molecules that can bind, adsorb, absorb or react with components in the liquid samples deposited on the sample surfaces. For example, a sample surface may comprise one or more capture agents that may react with an analyte in the liquid sample. In another example, the sample surface may comprise a layer that is capable of receiving and binding the capture agents themselves. Accordingly, in embodiments of the invention, the nature of the sample surface may change as the sample structure changes.

Elevating the sample surfaces with respect to a non-sample surface provides a number of advantages. For example, by elevating the sample surfaces, potential liquid cross-contamination between the liquid samples on adjacent structures is minimized. A liquid sample on a sample surface does not easily flow to an adjacent sample surface, since the sample surfaces are separated by a depression. In some embodiments, cross-contamination between samples on adjacent sample surfaces is reduced even though rims are not present to confine a liquid sample to a sample surface. Since rims need not be present to confine the samples to their respective sample surfaces, the spacing between adjacent sample surfaces can be reduced, thus increasing the density of the sample surfaces. As a result, more liquid samples may be processed and/or analyzed per chip than in conventional methods. In addition, small liquid sample volumes can be used in embodiments of the invention so that the amount of reagents used is also decreased, thus resulting in lower costs.

In some embodiments, the side or portion of the side surfaces of the structures may be provided with the same selected properties as the sample surface, or different selected properties from the sample surface. For example, the side surfaces of a pillar of a chip may be rendered hydrophobic while the sample surface of the pillar is hydrophilic. The hydrophilic sample surface of a pillar attracts the liquid samples, while the hydrophobic side surfaces of the pillar inhibit the liquid samples from flowing down the sides of the pillars. Accordingly, in some embodiments, a liquid sample may be confined to the sample surface of a pillar without a well rim. Consequently, in embodiments of the invention, cross-contamination between adjacent sample surfaces may be minimized while increasing the density of the sample surfaces.

In an illustrative example of how a chip according to an embodiment of the invention can be used, a first dispenser may deposit a number of liquid samples comprising respectively different proteins on the sample surfaces on a plurality of pillars on the base of the chip. The first dispenser may be a "passive valve" type dispenser. Passive valve type dispensers are described in further detail below. The different proteins, which may be capture agents, may then bind to the different sample surfaces on respectively different pillars. A second dispenser, which may be the same or different than the first dispenser, can then dispense fluids comprising analytes onto the sample surfaces of the pillars. The fluids may remain in contact with the sample surfaces for a predetermined period of time so that analytes in the fluids may have time to interact (e.g., bind, react) with the proteins on the sample surfaces. The predetermined period of time may be greater than about 30 seconds (e.g., greater than about 1 minute). However, the time may vary depending upon the particular interaction taking place. After the predetermined time has elapsed, the sample surfaces of the pillars may be washed and/or exposed to wash or reagent liquids to remove any unbound analytes or reaction products. The wash and/or reagent liquids can address each pillar independently or jointly, or by exposure to a liquid source through, for example, flooding. The sample surfaces can then be analyzed to determine which, if any, of the analytes in the fluids may have interacted with the bound proteins.

The analysis may take place using any suitable process and may be quantitative or qualitative. The sample surfaces may be analyzed to determine, for example, which analytes bind to the sample surfaces and/or how many analytes are bound to the sample surfaces. In one embodiment, fluorescent tags can be attached to the analytes in the fluids, while the proteins bound to the sample surfaces are free of tags or contain different tags. Binding between the analytes and the bound proteins can be observed or detected by, for example, fluorescence, fluorescence polarization, surface plasmon resonance (SPR), imaging SPR, ellipsometry, or imaging ellipsometry.

In another example of how the chips according to embodiments of the invention may be used, potential drug candidates and a plurality of potential drug candidates can be assayed substantially simultaneously. For instance, synthesized organic compounds may be tested for their ability to act as inhibitors to a family of receptors that are immobilized on different sample surfaces. The synthesized compounds and binding ligands for the receptors may be present in liquid samples that are deposited on the sample surfaces of a chip. Receptors corresponding to the ligands may be immobilized on the sample surfaces. After the liquid samples are deposited on the sample surfaces, a period of time may then pass to allow any potential interactions to occur between the ligands and the receptors. The sample surfaces may then be analyzed to see if the ligands bind to the receptors. If a binding ligand in a liquid sample does not bind to the immobilized receptor, the organic compound dispensed with the ligand may inhibit the interaction between the ligand and the receptor. The organic compound may then be identified as a potential drug candidate.

In another example, liquid samples containing proteins may be deposited on the sample surfaces of the sample structures of a chip. When the sample surfaces receive the liquid samples, they may be within or proximate to the fluid channels of a dispenser. At this point, each fluid channel can serve as a reaction chamber where a reaction can take place. For example, while the sample surfaces of the chip are within or proximate to the fluid channels, various other reagents in liquid samples may be deposited on the previously deposited samples. The reagents can unfold, cleave, or derivatize the proteins in the previously deposited liquid samples. The proteins in the liquid samples may be processed while they are (1) on the sample surfaces, (2) in liquid drops on the sample surfaces, or (3) while the sample surfaces are in or proximate to the fluid channels. The processed proteins may then be transferred to an analysis device such as a mass spectrometer. In other embodiments, proteins in the deposited liquid samples may, for example, unfold or cleave without subsequently deposited reagents. For example, the proteins in deposited liquid samples may unfold, cleave, or otherwise change if left on the sample surfaces for a predetermined period of time.

Although proteins are mentioned in this example and in other examples, other compounds could serve as a reactant, a catalyst, or an enzyme. A component that is bound to a sample surface may be a counterpart to the reactant, catalyst, or enzyme. It is understood that proteins are cited herein as exemplary samples and components and embodiments of the invention are not limited to the processing or analysis of proteins. In embodiments of the invention, the interaction between any two components may be analyzed.

Figure 2A:
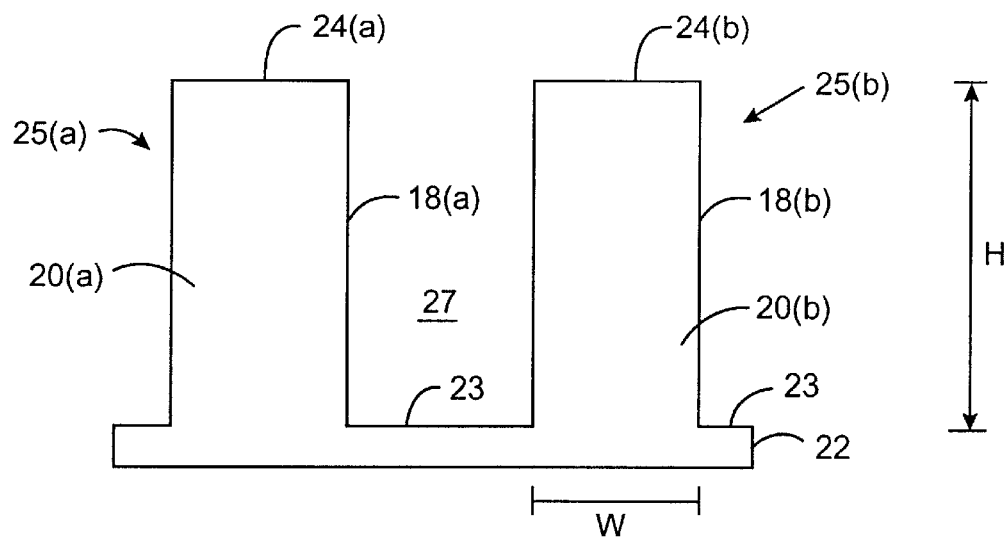
FIGS. 2(a)–2(b) show cross-sections of chips including pillars.

FIG. 2(a) shows a cross-sectional view of a chip according to an embodiment of the invention. The illustrated chip includes a base 22 and sample structures 25(a), 25(b) comprising pillars 20(a), 20(b). The base 22 and the pillars 20(a), 20(b) may form an integral structure formed from the same material. Alternatively, the base 22 and the pillars 20(a), 20(b) may be distinct and may be formed from different materials. Each pillar 20(a), 20(b) may consist of a single material (e.g., silicon), or may include two or more sections of different materials.

The base 22 of the chip may have any suitable characteristics. For instance, the base 22 of the chip can have any suitable lateral dimensions. For example, in some embodiments, the base 22 can have lateral dimensions less than about 2 square inches. In other embodiments, the base 22 can have lateral dimensions greater than 2 square inches. The non-sample surface of the base 22 may be generally planar. However, in some embodiments, the base 22 may have a non-planar surface. For example, the base 22 may have one or more troughs. The structures containing the sample surfaces and the pillars may be in the trough. Any suitable material may be used in the base 22. Suitable materials include glass, silicon, or polymeric materials. Preferably, the base 22 comprises a micromachinable material such as silicon.

The pillars 20(a), 20(b) may be oriented substantially perpendicular with respect to the base 22. Each of the pillars 20(a), 20(b) includes a sample surface 24(a), 24(b) and side surfaces 18(a), 18(b). The side surfaces 18(a), 18(b) of the pillars 20(a), 20(b) can define respective sample surfaces 24(a), 24(b) of the pillars 20(a), 20(b). The sample surfaces 24(a), 24(b) may coincide with the top surfaces of the pillars 20(a), 20(b) and are elevated with respect to the non-sample surfaces 23 of the chip. The non-sample surfaces 23 and the sample surfaces 24(a), 24(b) may have the same or different coatings or properties. Adjacent sample surfaces 24(a), 24(b) are separated by a depression 27 that is formed by adjacent pillars 20(a), 20(b) and the non-sample surface 23.

The pillars 20(a), 20(b) may have any suitable geometry. For example, the cross-sections (e.g., along a radius or width) of the pillars may be circular or polygonal. Each of the pillars 20(a), 20(b) may also be elongated. While the degree of elongation may vary, in some embodiments, the pillars 20(a), 20(b) may have an aspect ratio of greater than about 0.25 or more (e.g., 0.25 to 40). In other embodiments, the aspect ratio of the pillars may be about 1.0 or more. The aspect ratio may be defined as the ratio of the height H of each pillar to the smallest width W of the pillar. Preferably, the height of each pillar may be greater than about 1 micron. For example, the height of each pillar may range from about 1 to 10 microns, or from about 10 to about 200 microns. Each pillar may have any suitable width including a width of less than about 0.5 mm (e.g., 100 microns or less).

The liquids (not shown) can be in the form of discrete volumes of liquid and can be present on the sample surfaces 24(a), 24(b) of the pillars 20(a), 20(b), respectively. The liquid samples may be deposited on the sample surfaces 24(a), 24(b) in any suitable manner and with any suitable dispenser (not shown). The dispenser may include one or more passive valves within the fluid channels in the dispenser. Dispensers with passive valves are described in greater detail below.

The liquid samples may contain components (e.g., analytes, targets, capture agents) that are to be analyzed, reacted, or deposited on the sample surfaces 24(a), 24(b). Alternatively or additionally, the liquid samples may contain components that are to be deposited on the surfaces of the pillars 20(a), 20(b) for subsequent analysis, assaying, or processing. For example, the liquid samples on the pillars 20(a), 20(b) can comprise proteins. The proteins in the liquid samples may bind to the sample surfaces 24(a), 24(b). The proteins on the sample surfaces 24(a), 24(b) can then be analyzed, processed, and/or subsequently assayed, or used as capture agents for capturing analytes. For example, after binding proteins to the sample surfaces 24(a), 24(b), the bound proteins may be used as capture agents. Liquids containing analytes to be assayed against the capture agents may contact the surfaces 24(a), 24(b). The sample surfaces may then be analyzed to see if the analytes bind to the protein capture agents.

The liquid samples on the adjacent sample surfaces 24(a), 24(b) are separated from each other by the depression 27 between the adjacent structures. If, for example, a liquid sample flows off of the sample surface 24(a), the liquid sample flows into the depression 27 between the adjacent structures without contacting and contaminating the sample on the adjacent sample surface 24(b). To help retain the samples on the sample surfaces 24(a), 24(b), the side surfaces 18(a), 18(b) of the pillars 20(a), 20(b) may be rendered liquiphobic or may be inherently liquiphobic. For example, the side surfaces 18(a), 18(b) may be coated with a hydrophobic material or may be inherently hydrophobic. In other embodiments, the side surfaces 18(a), 18(b) of the pillars may also be coated with a material (e.g., alkane thiols or polyethylene glycol) resistant to analyte binding. The non-sample surface 23 may also be resistant to analyte binding or may be liquiphobic, or may consist partially or fully of the same material as the sample surfaces 24(a), 24(b).

In some embodiments, the pillars may have one or more channels that surround, wholly or in part, one or more pillars on the base. Examples of such channels are discussed in U.S. patent application Ser. No. 09/353,554 which is assigned to the same assignee as the present application and which is herein incorporated by reference in its entirety for all purposes. This U.S. Patent Application also discusses surface treatment processes and compound display processes that can be used in embodiments of the invention.

Figure 2B:
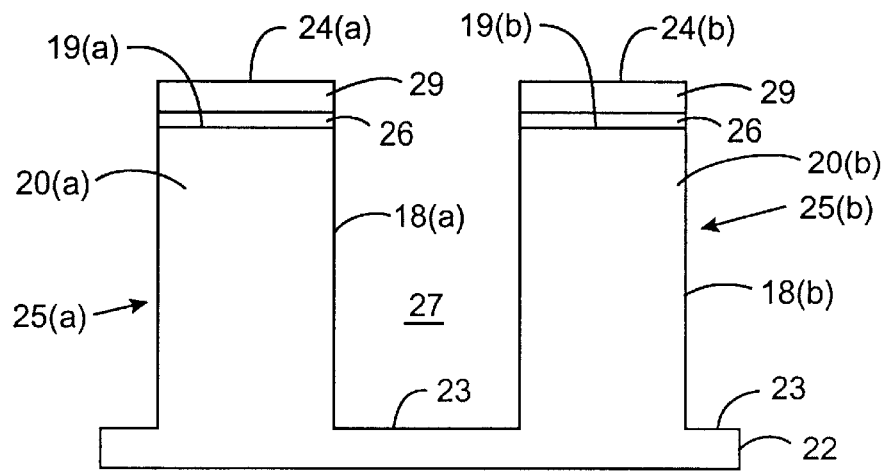

The top regions of the sample structures 25(a), 25(b) may include one or more layers of material. For example, FIG. 2(b) shows a cross-sectional view of a chip with pillars 20(a), 20(b) having a first layer 26 and a second layer 29 on the top surfaces 19(a), 19(b) of the pillars 20(a), 20(b). In this example, the sample surfaces 24(a), 24(b) of the structures 25(a), 25(b) may correspond to the upper surface of the second layer 29. In some embodiments, the top regions of the structures 25(a), 25(b) may be inherently hydrophilic or rendered hydrophilic. As explained in further detail below, hydrophilic surfaces are less likely to adversely affect proteins that may be at the top regions of the structures 25(a), 25(b).

The first and the second layers 26, 29 may comprise any suitable material having any suitable thickness. The first and the second layers 26, 29 can comprise inorganic materials and may comprise at least one of a metal or an oxide such as a metal oxide. The selection of the material used in, for example, the second layer 29 (or for any other layer or at the top of the pillar) may depend on the molecules that are to be bound to the second layer 29. For example, metals such as platinum, gold, and silver may be suitable for use with linking agents such as sulfur containing linking agents (e.g., alkanethiols or disulfide linking agents), while oxides such as silicon oxide or titanium oxide are suitable for use with linking agents such as silane-based linking agents. The linking agents can be used to couple entities such as capture agents to the pillars.

Illustratively, the first layer 26 may comprise an adhesion metal such as titanium and may be less than about 5 nanometers thick. The second layer 29 may comprise a noble metal such as gold and may be about 100 to about 200 nanometers thick. In another embodiment, the first layer 26 may comprise an oxide such as silicon oxide or titanium oxide, while the second layer 29 may comprise a metal (e.g., noble metals) such as gold or silver. Although the example shown in FIG. 2(b) shows two layers of material on the top surfaces 19(a), 19(b) of the pillars 20(a), 20(b), the top surfaces 19(a), 19(b) may have more or less then two layers (e.g., one layer) on them. Moreover, although the first and the second layers 26, 29 are described as having specific materials, it is understood that the first and the second layers 26, 29 may have any suitable combination of materials.

The layers on the pillars may be deposited using any suitable process. For example, the previously described layers may be deposited using processes such as electron beam or thermal beam evaporation, chemical vapor deposition, sputtering, or any other technique known in the art.

In embodiments of the invention, an affinity structure may be on a pillar, alone or in combination with other layers. For example, the affinity structure may be on an oxide or metal layer on a pillar or may be on a pillar without an intervening layer. Preferably, the affinity structure comprises organic materials. In some embodiments, the affinity structure may consist of a single layer comprising molecules that are capable of binding to specific analytes (e.g., proteins). For instance, the affinity structure may comprise a single layer of capture agents that are bound to the surface of, for example, a metal or oxide layer on a pillar. The capture agents may comprise, for example, antibodies, antibody fragments, polypeptides, receptors, DNA strands, fragments, RNA strands or fragments, aptamers, etc. The capture agents can bind to components in a liquid medium through a covalent or a non-covalent mechanism. The affinity structure (and the elements of the affinity structure) can be used to increase the spacing between a top surface (e.g., a silicon surface) of a pillar and a protein that is attached to the top surface of the pillar. The spacing can decrease the likelihood that the attached protein might become deactivated by, for example contacting a solid surface of the sample structure.

In other embodiments, the affinity structure may comprise an organic thin film, affinity tags, adaptor molecules, and capture agents, alone or in any suitable combination. When any of these are used together, the organic thin film, affinity tags, adaptor molecules, and the capture agents may be present in two or more sublayers in the affinity structure. For example, the affinity structure may include three sublayers, each sublayer respectively comprising an organic thin film, affinity tags, and adaptor molecules.

The organic thin film, affinity tags, and adaptor molecules may have any suitable characteristics. An "organic thin film" is a normally a thin layer of organic molecules that is typically less than about 20 nanometers thick. Preferably, the organic thin film is in the form of a monolayer. A "monolayer" is a layer of molecules that is one molecule thick. In some embodiments, the molecules in the monolayer may be oriented perpendicular, or at an angle with respect to the surface to which the molecules are bound. The monolayer may resemble a "carpet" of molecules. The molecules in the monolayer may be relatively densely packed so that proteins that are above the monolayer do not contact the layer underneath the monolayer. Packing the molecules together in a monolayer decreases the likelihood that proteins above the monolayer will pass through the monolayer and contact a solid surface of the sample structure. An "affinity tag" is a functional moiety capable of directly or indirectly immobilizing a component such as a protein. The affinity tag may include a polypeptide that has a functional group that reacts with another functional group on a molecule in the organic thin film. Suitable affinity tags include avidin and streptavidin. An "adaptor" may be an entity that directly or indirectly links an affinity tag to a pillar. In some embodiments, an adaptor may provide an indirect or direct link between an affinity tag and a capture agent. Alternatively or additionally, the adaptor may provide an indirect or direct link between the pillar and, an affinity tag or a capture agent. The capture agent is preferably capable of capturing a protein from a liquid sample. In yet other embodiments, an adaptor may bind directly to a pillar or a layer on a pillar, and may be capable of binding to a component such as an analyte in a liquid sample. An example of a suitable adaptor is biotin. Other examples of organic thin films, affinity tags, adaptors, and capture agents are described in U.S. patent application Ser. Nos. 09/115,455, 09/353,215, and 09/353,555, which are herein incorporated by reference in their entirety for all purposes, and are assigned to the same assignee as the present application. These U.S. Patent Applications describe various layered structures that can be on the pillars in embodiments of the invention.

The use of an affinity tag provides several advantages. For example, an affinity tag can confer enhanced binding or reaction of the protein with an underlying organic thin film. Proteins, for instance, can be immobilized in a manner that does not require harsh reaction conditions that are adverse to protein stability or function.

The affinity structures and their sublayers may be formed using any suitable process including, for example, chemisorption, physisorption or chemoselective ligation processes. The materials of the sublayers may be bound to the other sublayer materials, the pillars, or layers on the pillars by a covalent or a non-covalent bonding mechanism.

Figure 3:
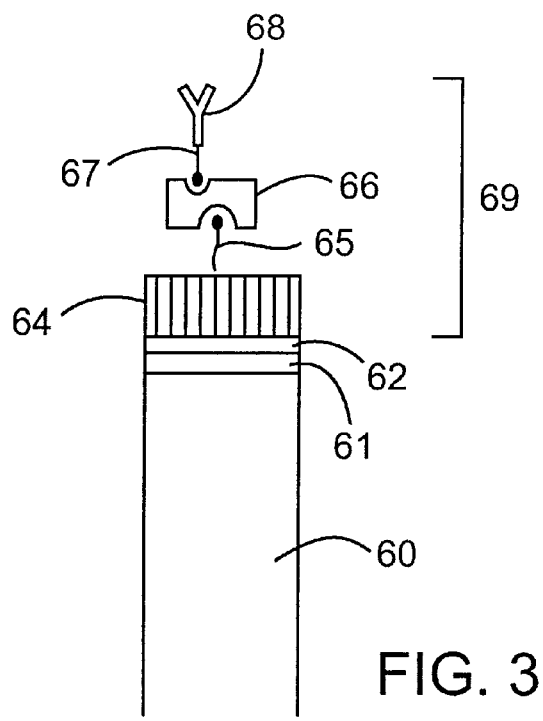
FIGS. 3 and 4 show cross-sectional views of pillars with affinity structures.
Figure 4:
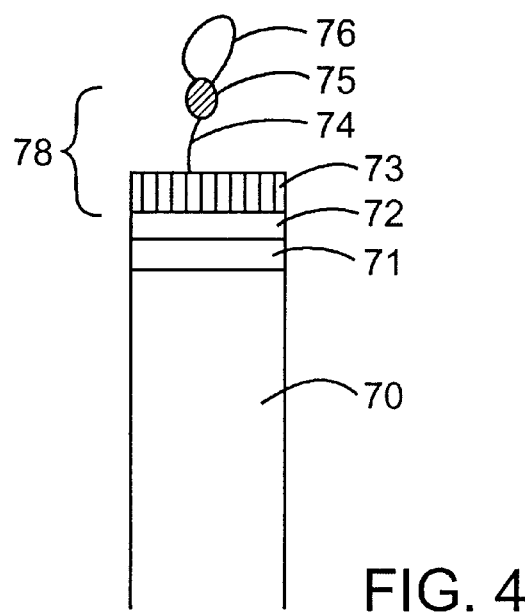

Examples of chip structures having affinity structures on the pillars are shown in FIGS. 3 and 4. FIG. 3 shows a cross-sectional view of a sample structure having an elevated sample surface. The sample structure includes a pillar 60. An interlayer 61 including an oxide such as silicon oxide is at the top surface of the pillar 60. The interlayer 61 may be used to bind the coating layer 62 to the pillar 60. The coating layer 62 may include another oxide such as titanium oxide. An affinity structure 69 is on the coating layer 62. The affinity structure 69 may include a monolayer 64 with organic molecules such as polylysine or polyethylene glycol. In some embodiments, the molecules in the monolayer 64 are linear molecules that may be oriented generally perpendicular to, or at an angle with, the surface the coating layer 62. Each of the organic molecules in the monolayer 64 may have functional groups at both ends to allow the ends of the molecules to bind to other molecules. A set of molecules including a first adaptor molecule 65 such as biotin, an affinity tag 66 such as avidin or streptavidin, a second adaptor molecule 67 such as biotin, and a capture agent 68 such as an antibody are linked together. The set of molecules is bound to the monolayer 64. In this example, the capture agent 68 is adapted to receive and capture an analyte in a liquid sample that is on the pillar 60. For simplicity of illustration, only one set of molecules is shown in FIG. 3. However, it is understood that in embodiments of the invention, many such sets of molecules may be present on the monolayer 64.

The embodiment shown in FIG. 3 has an affinity structure that has a number of sublayers. The affinity structures used in other embodiments of the invention may include more or less sublayers. For example, FIG. 4 shows a cross-sectional view of another sample structure having an affinity structure with fewer sublayers. The structure shown in FIG. 4 includes a pillar 70. An interlayer 71 including a material such as silicon dioxide is at the top surface of the pillar 70. A coating layer 72 including, for example, a metal oxide (e.g., titanium oxide) may be on the interlayer 71. An affinity structure 78 may be on the coating layer 72. The affinity structure 78 may include a monolayer 73, an affinity tag 74, and an adaptor molecule 75. The affinity tag 74 may be on the monolayer 73 and may couple the adaptor molecule 75 to the monolayer 73. The adaptor molecule 75 may in turn bind an analyte 76 such as a protein to the affinity tag 74.

The affinity structure components separate the sample surface from the top surface of the pillar. As noted above, proteins may deactivate when they come into contact with certain solid surfaces. The affinity structure may serve as a barrier between the pillar and any components in a liquid sample that are to be captured. This reduces the possibility that the top surface of the pillar may deactivate proteins in a liquid sample on the pillar. As shown in FIGS. 3 and 4, for example, the bound analyte 76 and the bound capture agent 68 are not in likely to contact a solid surface (e.g., the solid surfaces of the coating layers 62, 72). Consequently, the presence of the affinity structure 69, 78 decreases the likelihood that contact sensitive molecules such as proteins will be adversely affected by contact with a solid surface. To further reduce this possibility, the materials of the affinity structure may contain materials that are less likely to inactivate proteins.

Figure 5:
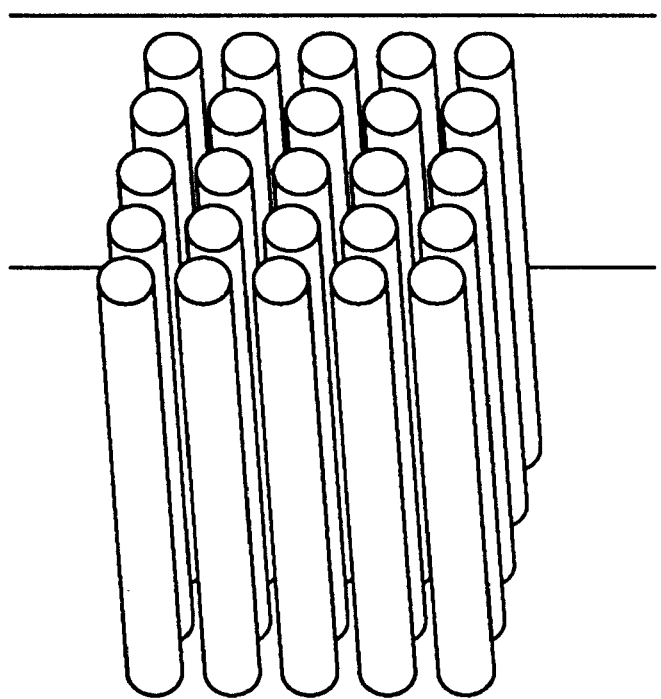
FIG. 5 shows a perspective view of an array of pillars.

The pillars may be present in an array on a base of the chip. An example of an array of pillars is shown in FIG. 5. The pillar array may be regular or irregular. For example, the array may have even rows of pillars forming a regular array of pillars. The density of the pillars in the array may vary. For example, the density of the pillars may be about 25 pillars per square centimeter or greater (e.g., 10,000 or 100,000 per $cm^2$ or greater). Although the chips may have any suitable number of pillars, in some embodiments, the number of pillars per chip may be greater than 10, 100, or 1000. The pillar pitch (i.e., the center-to-center distance between adjacent pillars) may be 500 microns or less (e.g., 150 microns).

Figure 6A:
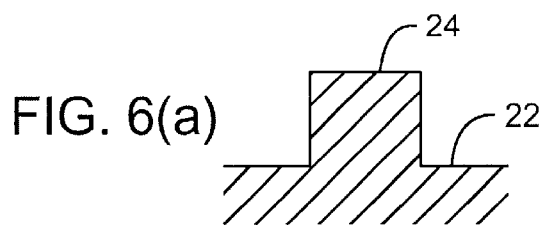
FIGS. 6(a) to 6(b) show cross-sections of pillars.
Figure 6B:
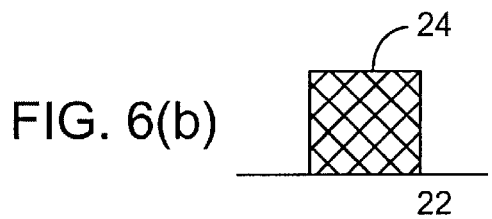
Figures 6C, 6D:
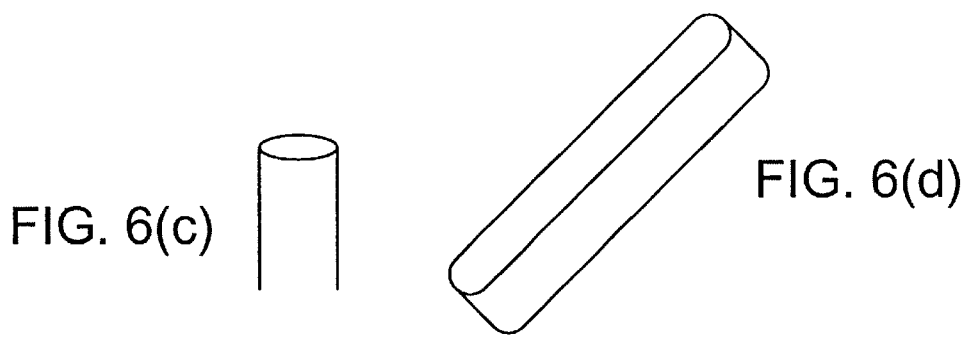
FIGS. 6(c) to 6(h) show perspective views of different types of pillars that may be on a base of a chip.
Figure 6E:
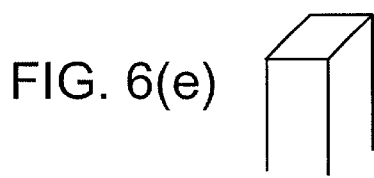
Figure 6F:
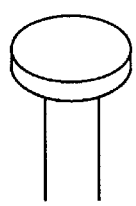
Figure 6G:
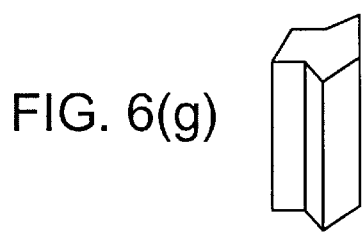
Figure 6H:
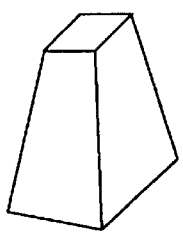
Figure 6I:
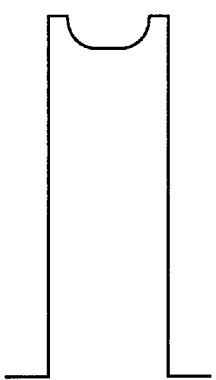
FIGS. 6(i) to 6(k) show cross-sections of pillars.

FIGS. 6(a)–6(b) show cross-sections of some pillar embodiments. FIG. 6(a) shows a pillar 24 that is integrally formed with respect to an underlying base 22. In such embodiments, the base 22 may consist of the same material as the pillar 24. FIG. 6(b) shows a pillar 24 that is on a base 22. The pillar 24 may include, for example, a porous material such as a hydrogel material. In embodiments of the invention, all, part, or parts of the pillar may be similarly or differently porous (e.g., may have the same or different degree of porosity). For instance, different strata within a pillar may be porous and can have different properties. By using a porous material, liquid samples can pass into the porous material, and the pillar 24 can hold more liquid sample than would be possible if the pillar 24 was non-porous. Consequently, more liquid sample can be present in a porous pillar than on a non-porous pillar of similar cross-sectional dimensions. If the liquid sample contains a fluorescent material, for example, more fluorescent material would be retained by the pillar than would be the case with a non-porous pillar. A higher quality signal (e.g., a stronger signal) may be produced as a result of the increased amount of fluorescent material in the porous pillar as compared with a non-porous pillar that may only have fluorescent material on the top surface of the pillar.

Other suitable pillar shapes are shown in FIGS. 6(c) to 6(k). The embodiment shown in FIG. 6(i) includes a depression at the top portion of the pillar. In this embodiment, the sample surface may lie below the topmost portion of the pillar.

Figure 6J:
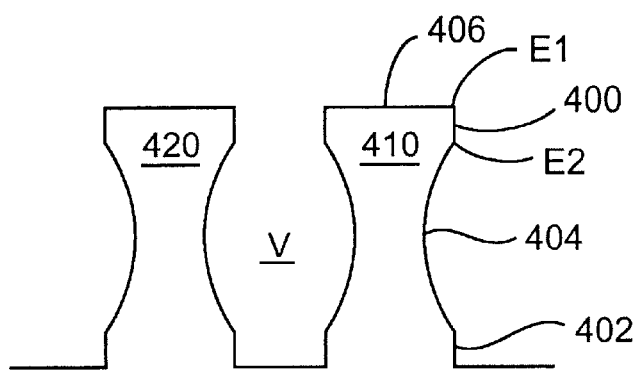
Figure 6K:
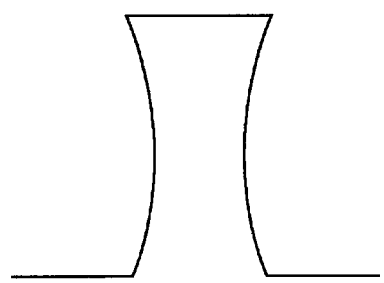
Figure 6I:
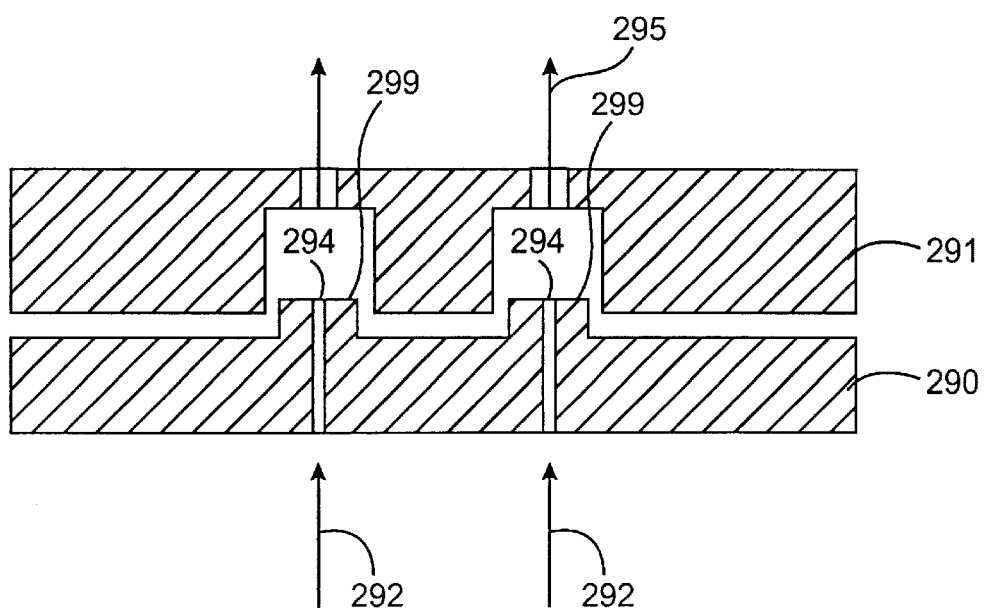
Figure 14:
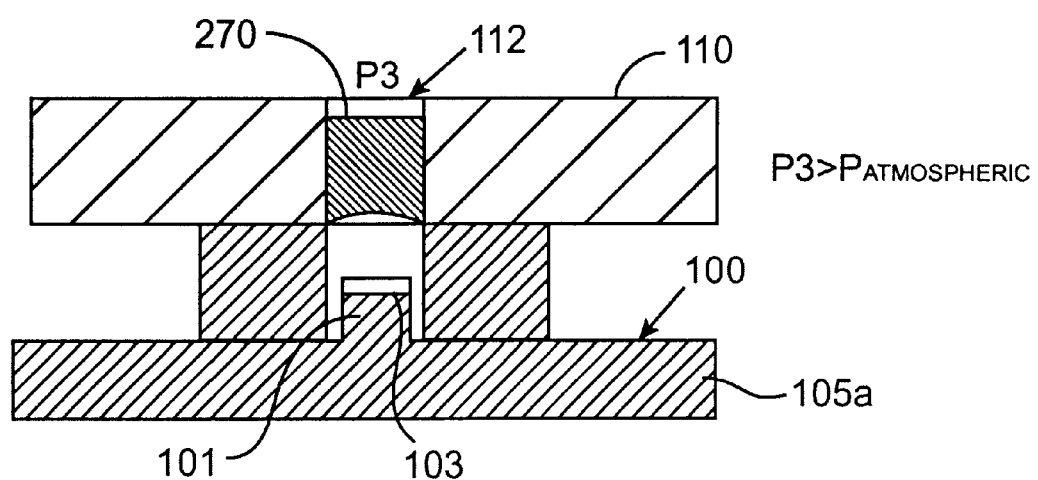
FIG. 14 shows a cross-sectional view of an assembly embodiment.

FIGS. 6(j) and 6(k) show pillars with concave portions. In the embodiment shown in FIG. 6(j), each of the pillars 410, 420 has two non-concave portions 400, 402, one portion 400 near the top and one portion 402 near the bottom. In this example, the side surface of each non-concave portion 400, 402 is substantially perpendicular to the top surface 406 of the pillar. A concave portion 404 lies between the two non-concave portions 400, 402. Each pillar includes abrupt changes in geometry where the concave portion 404 begins and ends. The concave portions 400, 402 may be formed using, for example, a reactive ion etch process. FIG. 6(k) shows a pillar with a concave side surface that begins at the top surface of the pillar and ends at the bottom surface of the pillar.

Using pillars with concave portions and abrupt structural changes can be advantageous. For example, by providing concave portions to the pillars, more empty space is provided in the regions between adjacent pillars. For example, referring to FIG. 6(j), the volume V between the adjacent pillars 410, 420 can be used to contain any liquid sample that may flow off of the sample surfaces of the pillars 410, 420. The volume V between adjacent pillars 410, 420 with concave portions is greater than the volume between adjacent pillars having substantially parallel side surfaces (compare, e.g., the pillars shown in FIG. 6(a)). Consequently, more space is provided to contain any liquids that may inadvertently flow off of the sample surfaces of the pillars. Moreover, the upper non-concave portion 400 of the pillar 410 shown in FIG. 6(j) has two structurally distinct edges E1, E2. As will be explained in further detail below, when pillars with abrupt structural changes (e.g., in FIG. 6(j)) are used, these structural changes can form two passive valves when used in conjunction with a dispenser with a cooperatively structured fluid channel. The two passive valves help to prevent a liquid sample from flowing down the sides of the pillars 410, 420. Furthermore, if a liquid sample flows off of the sample surface on the pillar, the concave surface of the pillar can provide a path for the liquid sample to flow inwardly and away from an adjacent sample surface. This also reduces the likelihood of potential liquid cross-contamination between adjacent sample surfaces.

In some embodiments, fluid passages may also be provided in the pillars of the chip. For example, FIG. 6(l) shows pillars 299 on a base 290. A fluid passage 294 extends through both the base 290 and the pillars 299. A fluid 292 such as a gas may pass through the fluid passages 294 toward the sample surfaces on the pillars 299 to remove substances from the sample surfaces. A cover chip 291 with corresponding apertures may be placed over the fluid passages 294 in the pillar 299 so that the apertures are over the sample surfaces. Gas may flow through the fluid passages 294 to carry processed samples 295 on the upper surfaces of the pillars 299 to an analytical device such as a mass spectrometer.

In a typical process of using the assembly shown in FIG. 6(l), liquids from a dispenser (not shown) may contact the sample surfaces on the pillars of a sample chip. The liquids may process substances on the sample surfaces on the pillars. For example, the liquids may comprise reagents that process proteins on the sample surfaces. After processing, the chip is separated from the dispenser, and the cover chip 291 is placed on the sample chip with the pillars 299. The apertures of the cover chip 291 are respectively over the sample surfaces, and gas flows through fluid passages 294 that extend through the pillars 299. The gas removes the processed substances from the sample surfaces and carries the processed substances through the apertures in the cover chip 291 and to an analysis device such as a mass spectrometer.

The sample chip shown in FIG. 6(l) can be used in other ways. For example, in other embodiments of the invention, liquids may also pass upwards through the fluid passages 294 and deposit on the sample surfaces of the sample chip (i.e., on the pillars). In yet other embodiments, the fluid passages 294 can be used to keep components at the sample surfaces hydrated. Hydrating gases or liquids (e.g., water) can pass through the fluid passages 294 to keep any components on the sample surfaces hydrated. For example, by keeping proteins on the sample surfaces hydrated, the proteins are less likely to denature. In some embodiments, the fluid passages 294 may be coupled to a sub-strata porous region of the pillar, useful, for example, to act as a liquid reservoir to supply liquid to the sample surface.

The pillars of the chip may be fabricated in any suitable manner and using any suitable material. For example, an embossing, etching or a molding process may be used to form the pillars on the base of the chip. For example, a silicon substrate can be patterned with photoresist where the top surfaces of the pillars are to be formed. An etching process such as a deep reactive ion etch may then be performed to etch deep profiles in the silicon substrate and to form a plurality of pillars. Side profiles of the pillars may be modified by adjusting process parameters such as the ion energy used in a reactive ion etch process. If desired, the side surfaces of the formed pillars may be coated with material such as a hydrophobic material while the top surfaces of the pillars are covered with photoresist. After coating, the photoresist may be removed from the top surfaces of the pillars. Processes for fabricating pillars are well known in the semiconductor and MEMS (microelectromechanical systems) industries.

II. Assemblies

Other embodiments of the invention are directed to fluid assemblies. The fluid assemblies according to embodiments of the invention may include a sample chip and a dispenser that can dispense one or more fluids on the sample surfaces of the chip. In some embodiments, a plurality of liquids may be supplied to the fluid channels in a dispenser. The liquids supplied to the different fluid channels may be the same or different and may contain the same or different components. For example, each of the liquids in respective fluid channels may include different analytes to be assayed. In another example, the liquids in respective fluid channels may contain different capture agents to be coupled to the pillars of the sample chip. The dispenser may provide liquids to the sample surfaces in parallel.

The chips used in the assemblies may be the same or different than the previously described chips. For example, the chips in the assemblies may include structures having elevated sample surfaces and pillars.

The dispenser may have any suitable characteristics, and can be positioned above the sample chip when liquids are dispensed onto the sample chip. Pressure may be applied to the liquids to dispense the liquids. To control liquid flow, the dispenser may include passive or active valves.

Active liquid valves are well known in the art. These valves control the flow or location of a liquid by actively changing a physical parameter. Some examples follow: 1) heat or light change the liquiphilic properties of a polymer which may be used to control the location of a liquid 2) electric potential can be used to induce an electrokinetic flow 3) MEMS structures can be used to block or unblock a liquid channel 4) the movement of magnetic particles or features in a channel can influence the liquid behavior.

In some embodiments, the dispensers have at least one passive valve per fluid channel. Preferably, the dispenser includes a plurality of nozzles. The plurality of nozzles can provide different liquids containing different components to different sample surfaces of the pillars substantially simultaneously. For instance, if there is an array of one hundred sample surfaces on a chip, then a dispenser may have one hundred sample nozzles that are arranged in a pattern similar to the array of sample surfaces. In other embodiments, the dispenser may have one or more nozzles that provide liquids on different sample surfaces in series. Examples of dispensers that can be used in embodiments of the invention include ring-pin dispensers, micropipettes, capillary dispensers, inkjet dispensers, hydrogel stampers, and dispensers comprising passive valves. In some embodiments, the dispensers may be in the form of a chip with a plurality of fluid channels. In these embodiments, each of the fluid channels can have an end that terminates at a bottom face of the dispenser chip. The dimensions of the fluid channels in the dispenser may vary. For example, a cross-sectional dimension of a fluid channel in the dispenser may be between about 1.0 to about 500 microns (e.g., about 1.0 to about 100 microns).

The dispensers used in embodiments of the invention may be made using any suitable process know in the art. For example, the dispenser may be made, for example, by a 3-D stereo lithography, mechanical drilling, ion etching, or a reactive ion etching process.

In some assembly embodiments, the sample structures of the chip may be cooperatively structured to fit into fluid channels in a dispenser. The sample structures and their corresponding sample surfaces may be aligned with the fluid channels. After aligning, the sample surfaces may be positioned in the fluid channels or at the ends of the fluid channels. Fluids in the fluid channels may then contact the sample surfaces of the structures. For example, pressure (e.g., caused by pneumatic forces, electrophoretic or electrowetting forces) may be applied to a liquid in a fluid channel so that the liquid flows and contacts the sample surface in the fluid channel. In other embodiments, the distance between the sample surface and the liquid in a fluid channel may decrease until they contact each other. The chip and/or the dispenser may move toward each other to decrease the spacing between the sample surface and the liquid in the fluid channel. In these embodiments, pressure may or may not be applied to the liquid in the fluid channel.

The fluid channels in the dispenser may serve as reaction chambers (or interaction chambers) that can house respectively different interactions such as reactions or binding events. Each sample surface and the walls of a corresponding fluid channel may form a reaction chamber. In a typical assembly, each individual reaction chamber may house a different event (e.g., a different reaction or binding event). In other embodiments, the different reaction chambers may house the same types of events.

Illustratively, a dispenser may provide liquids to the sample surfaces of the chip structures. The liquids may contain molecules that may or may not interact with molecules bound to the sample surfaces of the chip. First, the sample structures containing the sample surfaces may be aligned with the fluid channels. After aligning, the sample surfaces may be inserted into or positioned proximate to the fluid channels. While the sample surfaces are in or proximate to the fluid channels, the liquids in the fluid channels of the dispenser flow and contact the sample surfaces. This allows the molecules bound to the sample surfaces and the molecules in the liquids to react or interact with each other in a nearly closed environment. The interactions or reactions can take place minimizing the exposure of the liquid samples on the sample surfaces to a gaseous environment such as air. Consequently, the likelihood that the liquid samples will evaporate is reduced. After a predetermined time has elapsed, the sample surfaces may be withdrawn from the fluid channels, and/or the chip and the dispenser may be separated from each other. The sample surfaces of the chip can then be rinsed. Products of the reactions or interactions may remain on the sample surfaces. The products at the sample surfaces may then be analyzed to determine, for example, if a reaction has taken place. Alternatively or additionally, the products on the sample surfaces may be further processed or may be separated from the chip and may be transferred downstream of the sample surfaces for further processing or analysis. In other embodiments, the products at the sample surface may be capture agents that can be used to capture analytes in liquids.

Embodiments of the invention may be used to transfer liquids containing capture agents, analytes, etc. to sample surfaces of a chip without forming droplets. For example, a liquid need not pass through a gaseous medium (e.g., air) when it is transferred from a dispenser to the chip. This minimizes the creation of liquid volumes with large surface-to-volume ratios. In embodiments of the invention, small volumes of liquids may be transferred to a chip and processed on the chip while minimizing alterations (e.g., protein denaturing) of components in the transferred liquids.

Some assembly embodiments may be described with reference to FIGS. 7 to 9. FIG. 7 shows a dispenser 110 and FIG. 8 shows a chip 105. The chip 105 includes a plurality of pillars 101 on a base 105a. Each pillar 101 has a top sample surface 103 and a side surface 104. The sample surface 103 is elevated with respect to a non-sample surface of the base 105a.

The dispenser 110 includes a body 111 having at least one fluid channel 112 defined in the body 111. In this example, the fluid channels 112 are substantially vertical. As noted above, the fluid channels 112 may define reaction chambers that can house chemical or biological reactions or interactions. At least a portion of the fluid channels 112 may be oriented in a z direction with respect to an x–y plane formed by the body 111 of the dispenser 110. In this example, the fluid channels 112 illustrated in FIG. 7 are vertical and have one end terminating at an upper surface of the body 111 and the other end terminating at a lower surface of the body 111.

In other dispenser embodiments, the fluid channels 112 may have horizontal and vertical portions. For example, one end of a fluid channel may originate at an upper surface of the body and may pass horizontally across the upper surface of the body. At some predetermined point on the body, the orientation of the fluid channel changes from a horizontal orientation to a vertical orientation and terminates at a lower surface of the body of the dispenser. Moreover, although the number of fluid channels 112 in the dispenser is shown to be equal to the number of pillars 101 in the assembly shown in FIGS. 7 and 8, the number of fluid channels and the number of pillars of a chip may be different in other embodiments.

The walls defining the fluid channels 112, as well as a bottom surface 113 of the dispenser 110 may be coated with various materials that influence the behavior of the liquid in the fluid channels 112 (e.g., wetting). For instance, the fluid channel walls may be coated with materials that increase or decrease the interaction between fluid channel walls and the liquids in the fluid channels. For example, the walls defining the fluid channels 112 may be coated with a hydrophilic material. Proteins, for example, are less likely to denature if they come in contact with a hydrophilic surface than with a non-hydrophilic surface.

The fluid channels 112 in the dispenser 110 may be cooperatively structured to receive the pillars 101. For example, as shown in FIG. 8, the pillars 101 of the chip 105 may be insertable into the fluid channels 112 in the body of the dispenser 110. In this regard, the axial cross-sectional area of each of the fluid channels 112 in the dispenser 110 may be greater than the axial cross-sectional area of the pillars 101. When the pillars 101 are inserted into the fluid channels 112 in the dispenser 110, the sample surfaces 103 of the pillars 101 may be within respective fluid channels 112. The volumes defined by the fluid channels 112 and the top surfaces 103 of the pillars 101 may be reaction chambers where reactions can occur.

The chip 105 and the dispenser 110 may each have one or more alignment members so that they can be aligned with each other and the pillars can be aligned with the fluid channels. The alignment members may be alignment marks or alignment structures. Typical alignment structures may be, for example, a pin and a corresponding hole. For instance, the edges of the chip 105 may have one or more pins (not shown) that are longer than the pillars 101. These pins may be inserted into corresponding holes (not shown) at the edges of the dispenser 110 to align the chip 105 and the dispenser 110 and consequently align the pillars 101 with the fluid channels 112. The alignment members may be optical, mechanical, or magnetic. For example, in some embodiments, the alignment members may be high aspect ratio linear channels which permit light passage when, for example, the chip and the dispenser are operatively aligned. Alternatively, a magnetic region may induce a signal in a detector once, for example, the chip and the dispenser are operatively aligned.

The assembly embodiments may be used to perform assays. Illustratively, biological molecules such as proteins may be bound to the top surfaces 103 of the pillars 101. The pillars 101 may then be aligned with the fluid channels 112 of the dispenser 110 and liquids containing different potential candidate drugs can pass through the different vertical fluid channels 112 and to the sample surfaces of the pillars 101. Potential interactions or reactions between the different candidate drugs and the proteins can take place within these reaction chambers formed by the pillars 101 and the fluid chambers 112. A predetermined amount of time may be permitted to elapse to allow any reactions or interactions to occur. In some embodiments, the time may be 1 minute or more. In other embodiments, the elapsed time may surpass 30 minutes or more. After any reactions or interactions are permitted to occur, the chip 105 and the dispenser 110 may be separated from each other. Discrete liquid samples may be present on the top surfaces 103 of the chip 105 after the chip 105 is separated from the dispenser 110. Then, the sample surfaces 103 of the pillars 101 may be washed. The sample surfaces 103 may then be analyzed to determine which, if any, of the potential candidate drugs bind to the proteins on the top surfaces 103 of the pillars 101. To help identify the candidate drugs, the candidate drugs may have different fluorescent tags bound to them prior to being on the sample surfaces 103.

In another embodiment, the fluid channels 112 may have liquids with capture agents that are to be bound to the top surfaces of the pillars 101. The pillars 101 may be introduced in the fluid channels 112, thereby forming a small reaction chamber together with the inner fluid channel walls, the molecules in the liquid are thereby given the opportunity to react or bind (e.g., without leaving a distinct deposit of liquid on the pillar). Alternatively, the liquids can be deposited on the pillars 101 and the capture agents may bind to the top surfaces 103 of the pillars 101. The dispenser 110 and the chip 105 can be separated and the capture agents bound to the top surfaces may be used to capture analytes for analysis.

The assemblies may include one or more passive valves. A passive valve stops the flow of liquid inside or at the end of a capillary using a capillary pressure barrier that develops when the characteristics of the capillary or mini channel changes, such as when the capillary or channel cross-section changes abruptly, or when the materials of structures defining the fluid channels change abruptly. Passive valves are discussed in P. F. Man et al., "Microfabricated Capillary-Driven Stop Valve and Sample Injector," IEEE 11$^{th}$ Annual Int. MEMS Workshop, Santa Clara, Calif., Sept. 1999, pp. 45–50, and M. R. McNeely et at., "Hydrophobic Microfluidics," SPIE Conf. on Microfluidic Devices and Systems II, Santa Clara, Calif., September 1999, vol. 3877, pp. 210–220. Passive valves are unlike active valves which completely close off a fluid channel with a physical obstruction.

In an illustrative example of how an assembly with a passive valve can be used, the structures of a chip can be inserted into respective fluid channels in a dispenser. Each fluid channel can have one, two, or three or more passive valves. For instance, each fluid channel may have a passive valve that is formed by an abrupt structural change in the geometry of a fluid channel. For example, the walls of a fluid channel may form a step structure. When a liquid encounters the step structure at a predetermined pressure, the liquid stops flowing.

Passive valves can also be formed when the structures containing the sample surfaces are within or are positioned at the ends of the fluid channels. For example, a pillar may be inserted into a fluid channel so that there is a space between the side surfaces of the pillar that is in the fluid channel and the fluid channel walls around the pillar. The portion of the fluid channel where the pillar resides may have an annular configuration. As liquid flows towards the pillar, the geometry of the fluid channel changes from a cylindrical configuration to an annular configuration. At a predetermined pressure, the liquid stops flowing at this geometry change. Additional pressure is needed to cause the liquid to flow past this geometry change. Different pressures may be applied to initiate the flow of liquid past each of the passive valves in the fluid channel. For example, two different levels of pressure may be applied to a fluid in a fluid channel to move a liquid past two different passive valves.

In one specific example of an assembly with a dispenser using one or more passive valves, a chip including pillars is used with a dispenser containing a plurality of fluid channels. The pillars may be inserted into the fluid channels and the chip may be brought into contact with the dispenser. Before or after insertion, a first pressure is applied to the liquids in the fluid channels to push the fluid samples to, but not substantially past, the first passive valve. A second pressure is then applied to the fluid samples to push the samples past the first passive valve so that the liquids are in contact with the pillars. The samples do not pass the second passive valve, which is defined by the pillar and the channel walls. After the liquids in the fluid channels contact the sample surfaces, the pressure applied to the liquids is decreased. Then, the dispenser and the chip are separated from each other to separate the sample surfaces from the bulk of the liquids in the fluid channels. In this step, the pillars are withdrawn from the fluid channels and liquid samples may remain on the sample surfaces. Withdrawing the pillars from the fluid channels may stop any events that may be occurring at the sample surfaces. Alternatively, reactions can still occur after the pillars are withdrawn from the fluid channels and reactions can stop after a washing step is performed. After liquid samples are transferred to the sample surfaces, processes such as evaporation and the formation of an air-liquid interface will have little or no adverse effect on the deposited components in the liquid samples. Any residual solvent or material on the sample surface may be rinsed away leaving the desired components on the sample surfaces.

In other embodiments, the structures may be inserted into the fluid channels until contact is made with liquids within respective channels. In these embodiments, added pressure need not be applied to the fluids in the fluid channels to bring the fluids in contact with the sample surfaces of the structures.

The dispensers according to embodiments of the invention have a number of advantages. For instance, unlike conventional ring-pin dispensers, embodiments of the invention can deliver a large number of liquids to the sample surfaces in parallel. For example, in embodiments of the invention, 10,000 or more fluid channels can be used to dispense 10,000 liquid samples. In comparison, conventional ring-pin dispensers may have only about 30 ring pins per assembly. Also, unlike a capillary pin dispenser that can potentially physically touch a sample surface thus potentially damaging the dispenser and the sample surface, many of the described dispenser embodiments do not come in contact with the sample surface. Moreover, unlike many conventional dispensers, the assembly embodiments of the invention can reduce the likelihood of forming an air-liquid interface, since droplets are not formed when liquid is transferred from a dispenser to a chip. As the volume of a drop gets smaller, the surface to volume ratio of the drop gets larger leading to problematic interactions between the molecules in the liquid that are to be transferred to the sample surface and the air-liquid interface of the drop. In embodiments of the invention, droplets of liquid need not be formed, thus minimizing the formation of a liquid sample with a gas/liquid interface with a high surface to volume ratio.

Specific examples of assemblies using passive valves may be described with reference to FIGS. 10–14. Referring to FIGS. 10 and 11, a liquid 270 is placed in the fluid channel 112 in a dispenser 118. A first dispenser portion 120(a) may comprise a hydrophilic material and a second dispenser portion 120(b) may comprise a hydrophobic material. The fluid channel 112 is then aligned with a pillar 101 on a base 105a of a chip 100 and the pillar 101 is inserted into the fluid channel 112. As shown in FIG. 11, the dispenser 110 and the chip 100 are in contact with each other when the pillar 101 is inserted into the fluid channel 112. Before or after the pillar 101 is inserted into the fluid channel 112, a first pressure is applied to the liquid 270. The first pressure may be greater than atmospheric pressure. The liquid 270 flows to, but not past, a first passive valve 114 defined within the fluid channel 112. The passive valve 114 may be formed by an abrupt change in the cross-sectional area of the fluid channel 112. Alternatively or additionally, the passive valve 114 may be formed by an abrupt change in the material of the fluid channel walls (e.g., hydrophilic to hydrophobic). Regardless of the particular form that the passive valve 114 takes, the passive valve 114 prevents the liquid 270 from flowing out of the fluid channel 112 at the pressure P1.

Referring to FIG. 12, after the pillar 101 is inserted into the fluid channel 112, a pressure P2 may be applied to the liquid 270. The pressure P2 may be greater than the pressure P1. The applied pressure P2 causes the liquid 270 to flow past the first passive valve 114 and onto a material at the top surface 103 of the pillar 101 and to a second passive valve 115 defined by the top surface 103 of the pillar 101 and the surrounding walls of the fluid channel 112.

Referring to FIG. 13, the abrupt change in geometry occurs at a fluid channel region 109 near the top surface 103 of the pillar 101. In this example, this region 109 of the fluid channel 112 has an annular shape due to the presence of the pillar 101. The liquid 270 reacts with the material on the top surface 103 of the pillar 101. Alternatively, the liquid 270 and components in the liquid 270 may simply deposit on the top surface 103 of the pillar 101.

After the liquid 270 is on the top surface 103 of the pillar 101, the majority of the liquid 270 may be separated from the pillar 101. For example, referring to FIG. 14, a pressure less than the pressure P2 (e.g., less than atmospheric pressure) is applied to the liquid 270 so that the bulk of the liquid 270 flows upward while leaving a portion of the liquid 270 on the pillar 101. In other embodiments, the chip 105 and the dispenser 110 may be separated from each other to separate the bulk of the liquid 270 from the liquid deposited on the pillar 101. The pillar 101 may be withdrawn from the fluid channel 112 and the bulk of the liquid 270 may be retained in the fluid channel 112 of the separated dispenser 110. In some embodiments, separation of the pillar 101 from the fluid channel 112 may stop any interaction between the liquid and any material at the top surfaces of the pillar 101. In these embodiments, a pressure less than pressure P2 is not needed to separate the bulk of the fluid 270 from the pillar 101. After the dispenser 110 is separated from the chip, the top surface of the pillar 101 may be rinsed or flushed with another liquid. The rinsing or flushing step can stop any interactions between the liquid and any material at the top surfaces of the pillar 101, if the prior separation of the chip 105 and the dispenser 110 does not stop the interactions taking place.

Figure 15:
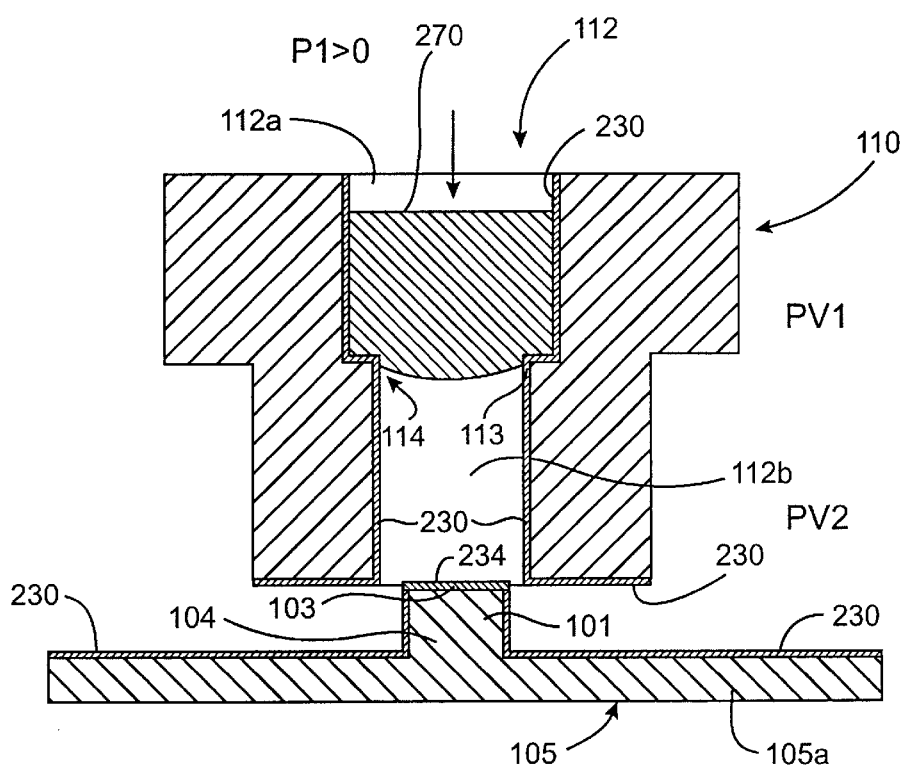
FIGS. 15 to 16 show cross-sectional views of assembly embodiments.

FIG. 15 illustrates an assembly embodiment with a dispenser with a passive valve. The dispenser 110 has a fluid channel 112 having a first channel section 112a communicating with a second channel section 112b. The first channel section 112a is wider than channel section 112b. In this example, both the first channel section 112a and the second channel section 112b terminate in a shoulder 113 which forms a restriction between the first channel section 112a and the second channel section 112b. The restriction (or a preventative means for preventing the flow of liquid 270) functions as a passive valve 114. The internal walls of the channel 112 may have a hydrophobic surface 230. The top surface 103 of the pillar 101 may be a hydrophilic surface 234.

In the embodiment shown in FIG. 15, the liquid 270 may be deposited on the pillar 101 in the same or different manner as the processes described with reference to FIGS. 10–14. For instance, the pillar 101 may be inserted into or positioned at the end (e.g., exactly at the end of the fluid channel or just outside of the end of the fluid channel) of the fluid channel 112 of the dispenser 110. The dispenser 110 may or may not contact the chip 105 during the process of depositing liquid onto the pillar 101. When the flow of liquid 270 is stopped at the first passive valve, the liquid 270 may be at a pressure $P_1$. A second pressure $P_2$, which is greater than the first pressure $P_1$, is subsequently applied to the liquid 270 to force the liquid 270 through and past the first passive valve 114 until it contacts the hydrophilic surface 234 on the pillar 101 that lies within the fluid channel 112. The upper portion of the pillar 101 and the surrounding fluid channel 112 may form a second restriction that forms a second passive valve. Alternatively, the hydrophilic surface 234 on top surface 103 of pillar 101 in combination with the hydrophobic surfaces 230 on the walls of second channel section 112b and on side 104 of pillar 101 functions as the second passive valve. In both instances, the flow of the fluid 270 stops at the upper surface of the pillar 101. The top surface of the chip base 105a may also be a hydrophobic surface 230. The bottom surface of the dispenser 110 may also be a hydrophobic surface 230.

The hydrophilic surface 234 may be produced according to any suitable process and may include any suitable materials. For example, silicon oxide (e.g., $SiO_2$), and polymers terminating in hydrophilic groups (e.g., OH or COOH) may be used to form a hydrophilic surface 234. The hydrophilic surface 234 on top of the pillars 101 may be produced according to procedures disclosed in U.S. patent application Ser. No. 09/115,397, which is assigned to the same assignee as the present invention and is herein incorporated by reference in its entirety for all purposes.

Figure 16:
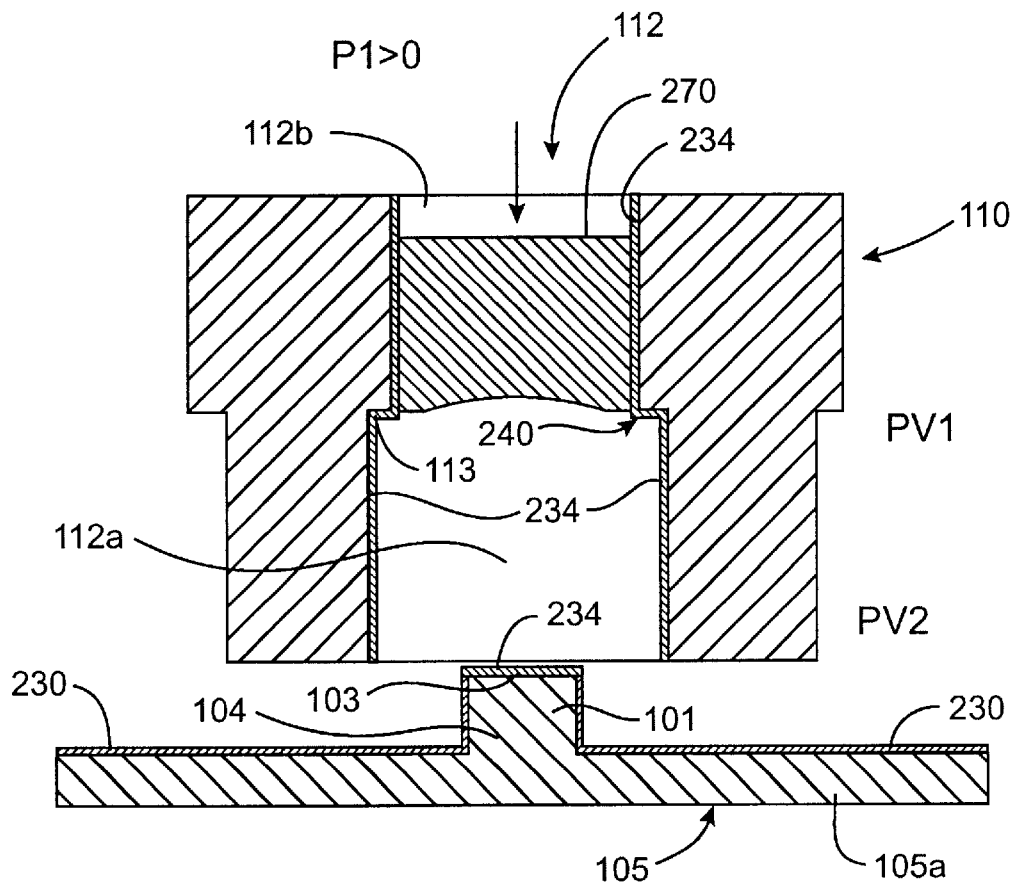

FIG. 16 shows another assembly embodiment. This embodiment is similar to the embodiment shown in FIG. 15. However, in this example, the second channel section 112b is on top of the first channel section 112a and the liquid 270 passes through the second channel section 112b before entering the first channel section 112a. The walls of the channel 112 in this example have the hydrophilic surface 234. A first pressure $P_1$ is applied to the liquid 270 to force the liquid 270 through the second channel section 112b up to, but not past, a first passive valve 240. In FIG. 16, the abrupt enlargement defines the first passive valve 240. The abrupt enlargement is an instantaneous increase of the width of the fluid channel 112 defines a shoulder 113. A second pressure $P_2$, which may be greater than the first pressure $P_1$, is subsequently applied to the liquid 270 to push the liquid 270 through and past the first passive valve 240 until contacting the hydrophilic surface 234 of the pillar 101. The liquid 270 encounters a restriction defined by the pillar 101 when the pillar 101 is in the channel 112. This restriction may function as a second passive valve. Alternatively or additionally, the hydrophilic surface 234 on top surface 103 and on internal wall of first channel section 112a in combination with the hydrophobic surface 230 on the pillar chip 105, including on the sides 104 of the pillar 101 may function as the second passive valve. The restriction prevents the flow of liquid 270 out of fluid channel 112 and onto the pillar chip 105.

FIGS. 17(a) to 17(d) show cross sections of assembly embodiments including a chip with a pillar having a concave side surface. A sequence of steps that may be used to deposit a liquid sample onto a sample surface of a pillar may be described with reference to FIGS. 17(a) to 17(d).

Figure 17A:
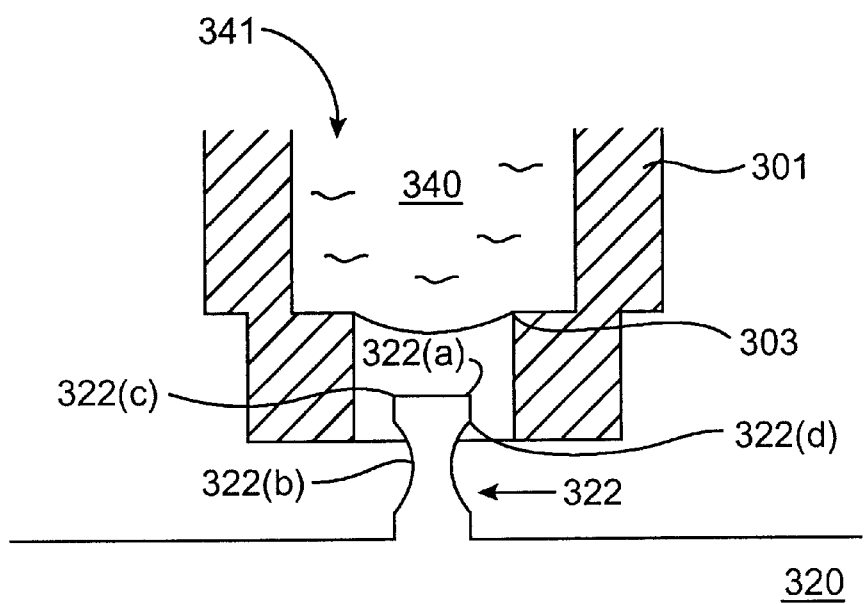
FIGS. 17(a) to 17(d) show cross-sectional views of an assembly embodiment including a chip with a pillar having a concave side surface.

FIG. 17(a) shows a pillar 322 on a base 320 of a chip. The pillar 322 includes a sample surface 322(a) and a side including a concave portion 322(b) between an upper non-concave portion and a lower non-concave portion. A first edge 322(c) and a second edge 322(d) define the upper non-concave portion. A dispenser 301 is above the chip, and a fluid channel 341 in the dispenser 301 is aligned with and is over the pillar 322. A liquid 340 is in the fluid channel 341 and a step structure 303 prevents the liquid 340 from passing to the pillar 322. The step structure 303 may function as a first passive valve that stops the flow of liquid at a pressure P1.

Figure 17B:
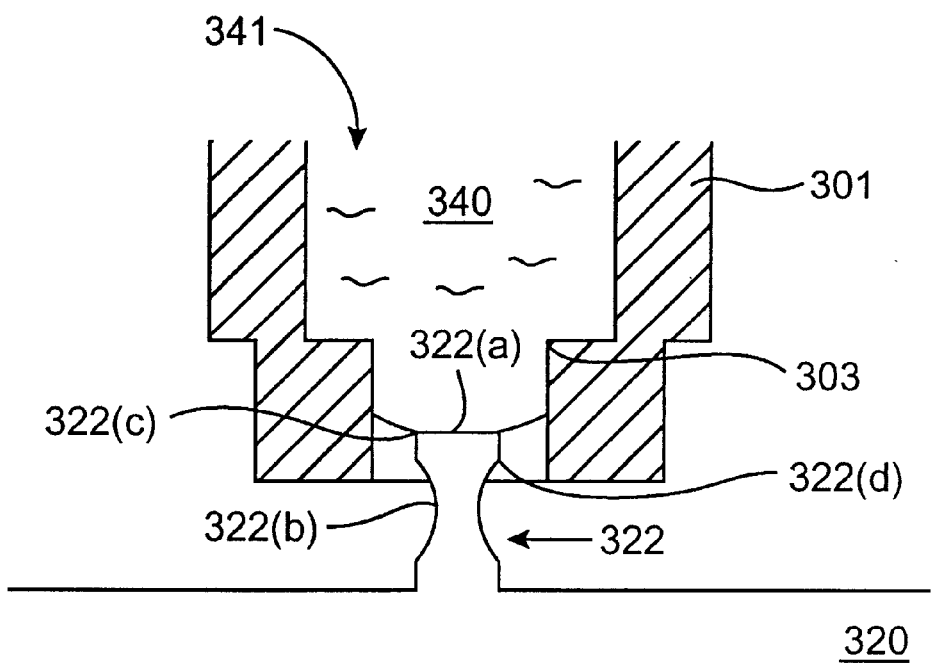

FIG. 17(b) shows the liquid 340 contacting the sample surface 322(a) of the pillar 322. In this example, a pressure P2 is applied to the liquid 340 so that the liquid sample flows past the step structure 303 of the dispenser 301. The pressure P2 in this example is greater than the pressure P1. At the pressure P2, the liquid 340 may flow until it encounters the edge surfaces 322(c), 322(d) of the upper non-concave portion. As shown in FIG. 17(b), the flow of the liquid 340 may stop at the upper edge 322(c) of the pillar. The edge 322(c) and a portion of the wall defining the fluid channel 341 may form a second passive valve that stops the liquid 340 from flowing past the edge 322(c) at the pressure P2.

Figure 17C:
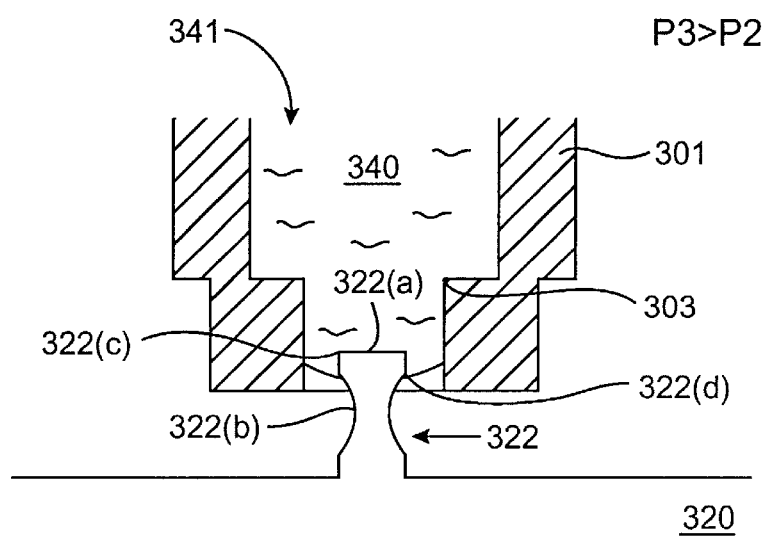

Alternatively or additionally, as shown in FIG. 17(c), the flow of the liquid 340 may stop at the bottom edge 322(d) of the upper non-concave portion of the pillar 322 when the pressure P3 is applied to the liquid 340. The edge 322(d) and the surrounding wall may form a third passive valve that stops the liquid 340 from flowing past the edge 322(d). The pressure P3 may be greater than the pressures P1 and P2.

Although pressure is applied to the liquid 340 in the examples shown in FIGS. 17(b) and 17(c), in other embodiments, a higher pressure need not be applied to the liquid 340 to bring the liquid 340 in contact with the sample surface 322(a) of the pillar 322. For instance, the pillar 322 and/or the dispenser 301 may move toward the other until they contact each other. Accordingly, in some embodiments, the sample surface and a liquid in a fluid channel can contact each other without applying additional pressure to the liquid 340.

Advantageously, the pillar 322 shown in FIGS. 17(b) and 17(c) can, when in a fluid channel, form two passive valves proximate the upper portion of the pillar 322. Having two passive valves instead of one to stop the flow of liquid at the top portion of the pillar 322 helps to ensure that a substantial amount of the liquid 340 does not flow down the sides of the pillar 322. The flow of liquid 340 down the sides of the pillar 322 is further minimized and the likelihood that the liquid sample will flow to an adjacent sample surface is also minimized. This further reduces the likelihood of cross-contamination between samples on different sample surfaces.

Figure 17D:
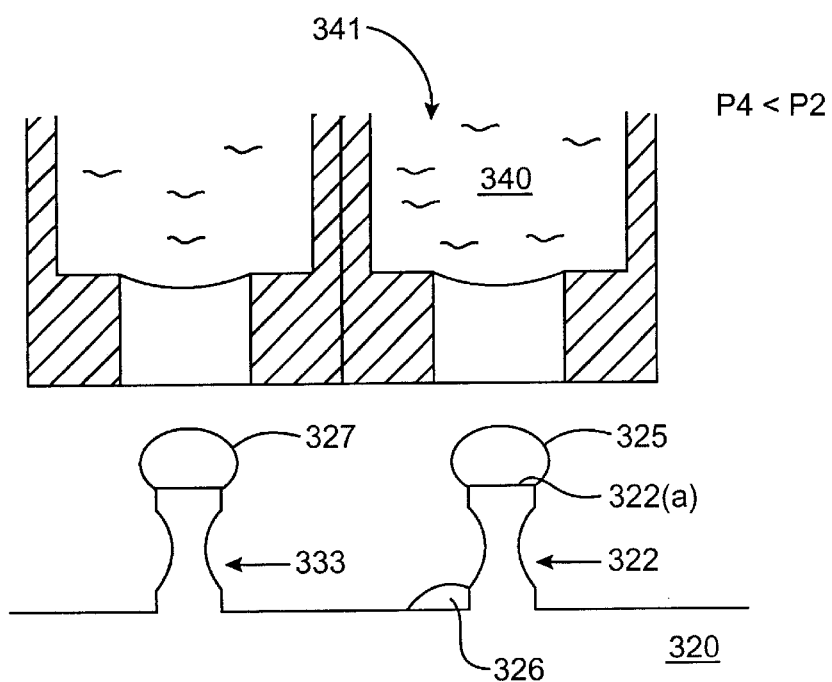

Referring to FIG. 17(d), after the liquid 340 contacts the sample surface 322(a) of the pillar 322, a portion 327 of the liquid 340 may deposit on the sample surface 322(a), while the bulk of the liquid 340 may be separated from the sample surface. This may be accomplished by applying a lower pressure to the liquid 340. For example, a pressure P4, which may be less than the pressures P2 and P3, may be applied to the liquid 340. The lower pressure causes the liquid 340 to flow upward into the fluid channel 341. Alternatively or additionally, the dispenser 301 and the chip may be separated from each other by moving the chip and/or the dispenser away from the other. If a portion 326 of the liquid sample does not deposit on the sample surface, it can flow down a side of the pillar 322 without flowing to a liquid sample 327 on an adjacent pillar 333. Cross-contamination between samples on adjacent surfaces is thus minimized.

Figure 18:
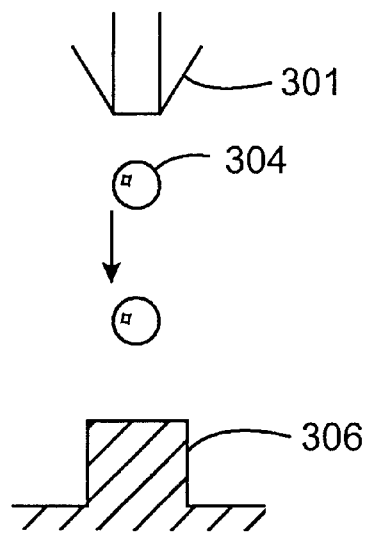
FIGS. 18 to 23 show cross-sections of various dispenser configurations.
Figure 19:
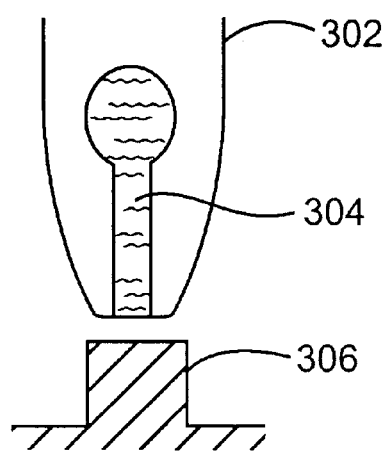
Figure 20:
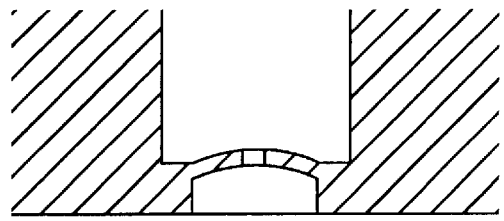
Figure 21:
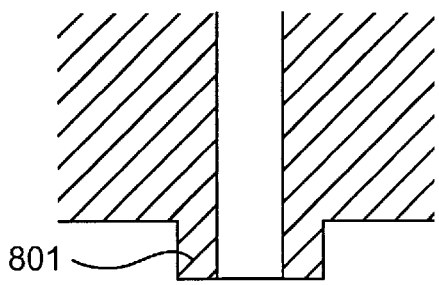
Figure 22:
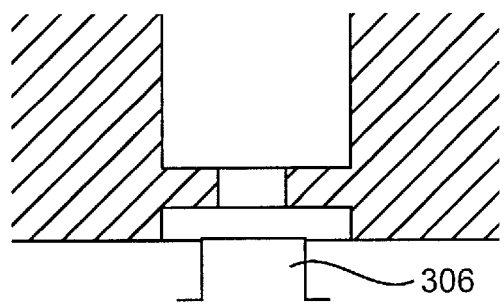
Figure 23:
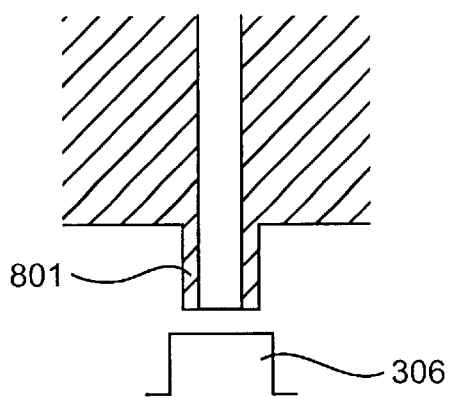

The dispensers used in embodiments of the invention may be in any suitable form. For example, FIGS. 18 to 23 illustrate cross-sections of portions of various types of dispensers. FIG. 18 illustrates a nozzle that dispenses droplets similar to an inkjet (micro-drop dispenser). FIG. 19 illustrates a metal pin for dispensing liquid onto the pillars. FIGS. 21 and 23 show dispensers with necks 801. The necks 801 can correspond to the ends of the fluid channels and can be used to pierce through an outer surface of a drop that is on a sample surface. A liquid sample can be delivered through a neck in the dispenser and into the interior of a drop of liquid. This minimizes contact between the liquid in the dispenser and the air. The necks 801 can also be used as a barrier to minimize cross-contamination between liquids in adjacent fluid channels in the dispenser.

As shown in FIGS. 18, 19, and 23, in some embodiments, portions of the fluid channel of a dispenser that are proximate to a pillar 306 may be smaller than the cross-sectional area of the pillar 306 so that the pillar 306 may not fit within the fluid channel of the dispenser. However, as shown in FIG. 22 and in many of the previous Figures, portions of a fluid channel of a dispenser may have a larger cross-sectional area than a pillar so that the pillar is removably insertable into the fluid channel.

Figure 24:
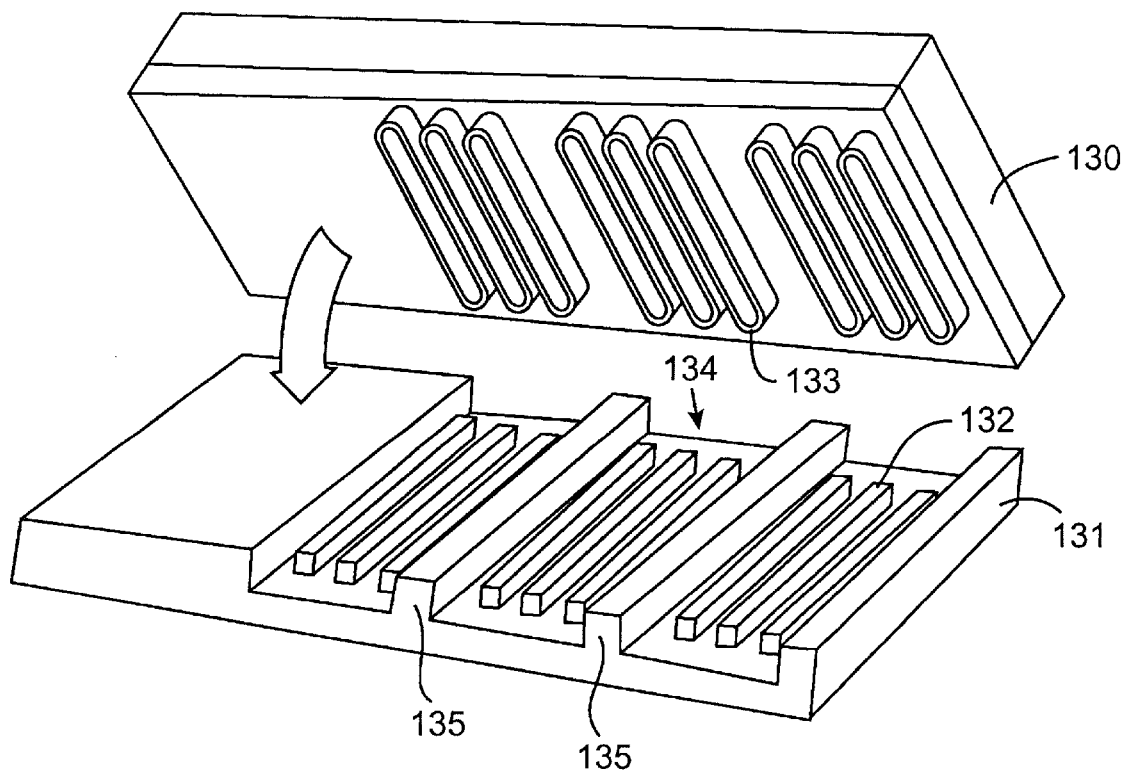
FIG. 24 shows a perspective view of an assembly embodiment.
Figure 25:
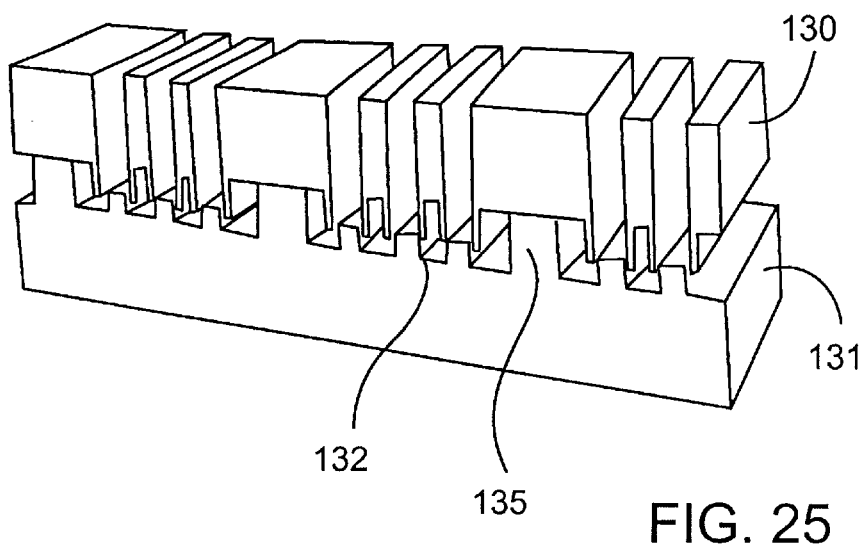
FIG. 25 shows a perspective cut-away view of a portion of the assembly embodiment shown in FIG. 24.

FIGS. 24 to 25 illustrate a dispenser 130 for use with a chip 131 that includes elongated pillars 132. Dispenser 130 includes elongated (e.g., in an x- or y-direction) dispenser nozzles 133 that engage or cooperate with the elongated pillars 132. The elongated dispenser nozzles 133 each have a neck that can be used to prevent cross-contamination between adjacent nozzles 133. Channels 134 are defined on the chip 131 by channel defining walls 135. The walls 135 of the chip 131 can contact and support the dispenser 130 while it is on the chip 131.

Figure 26:
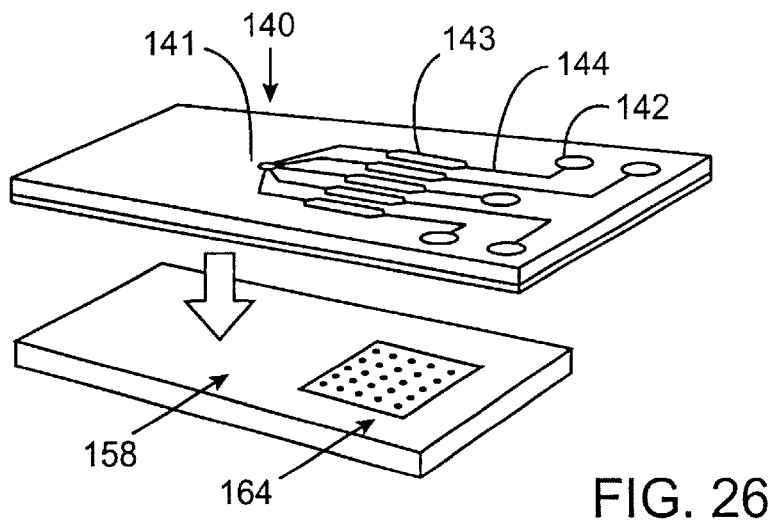
FIG. 26 shows an exploded view of an assembly embodiment.
Figure 27:
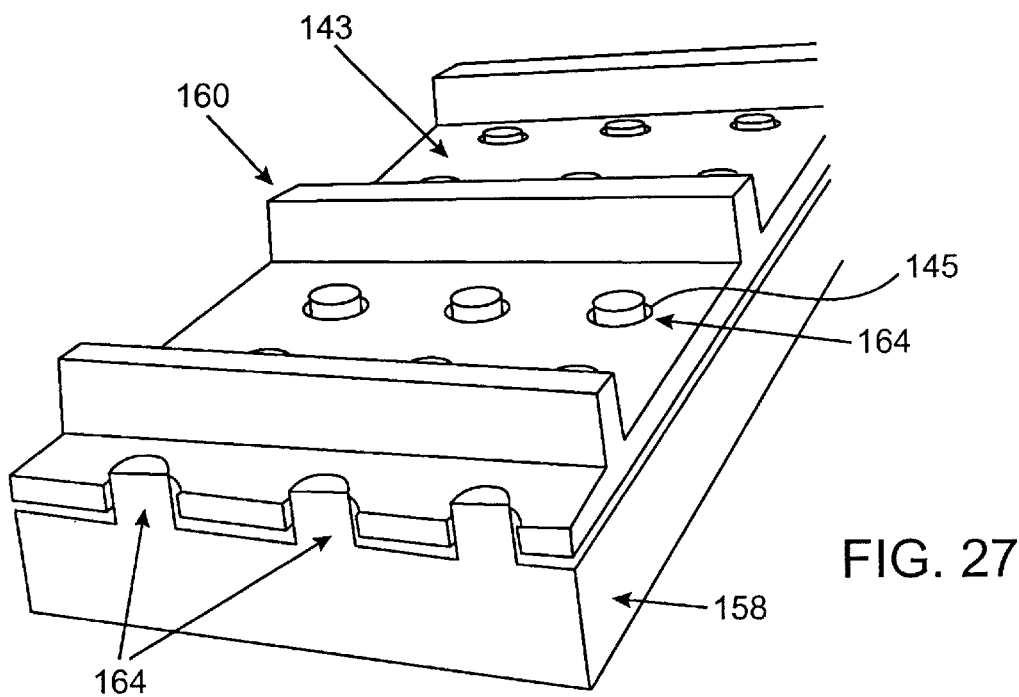
FIG. 27 shows a partial perspective, cut-away view of a portion of the assembly embodiment shown in FIG. 26.

FIGS. 26 to 27 illustrate an assembly with a specific type of dispenser. The dispenser may be referred to as a fluid addressing adaptor device 140. The adaptor device 140 may include fluid storage wells 142 that communicate with fluid channels 143 (defined by walls 160) via flow paths 144. The fluid flow paths 144 extend horizontally in the adaptor device 140. The pillars 164 on the chip 158 may be aligned with, inserted into, holes 145 in the bottom walls defining the fluid channels 143. The upper regions of the pillars 164 may protrude through the pillar holes 145. Unlike many of the previously described embodiments, liquids flowing through the fluid channels 143 may flow horizontally and may contact the top surfaces of the pillars 164 since the top surfaces are exposed to the flowing fluids. Different fluids may flow from respectively different storage wells 142. These different fluids may flow through the different fluid channels 143 and may contact the top sample surfaces of the pillars. After contacting the sample surfaces of the pillars 164, the liquid flowing downstream of the pillars 164 may pass to a fluid outlet 141. Embodiments of the invention can be used with microfluidic devices such as the "lab on a chip" type devices.

Furthermore, the dispenser or another device may be used in conjunction with other external devices such as a mass spectrometer. External devices such as these may be used to analyze reactions or interactions at the sample surfaces. Such external devices may be downstream of the sample surfaces. Further details regarding the use of assemblies with such external devices are in U.S. patent application Ser. No. 09/792,488, entitled "Microfluidic Devices and Methods", by Paul Jedrzejewski et al. filed concurrently herewith, and which is now U.S. Pat. No. 6,454,924. This application is herein incorporated by reference in its entirety for all purposes and is assigned to the same assignee as the present invention.

FIG. 28 illustrates another type of dispenser that may be referred to as an "anti-interference adaptor" 172. The anti-interference adaptor 172 may include a plurality of holes 180 at the bottom surface of the adaptor 172. In some embodiments, the anti-interference adaptor 172 may be translucent or transparent. As shown in FIG. 29, the pillars 178 of a chip 170 may be inserted into the holes 180 and may be adjacent to the chip 170. The adaptor 172 may include a fluid channel in the form of a flow chamber and a fluid inlet 174 and a fluid outlet 176. The flow chamber contains a liquid that contacts top sample surfaces of the pillars 178 of the chip 170. The liquid in the flow chamber flows horizontally and contacts a plurality of the sample surfaces substantially simultaneously. By using the flow-cell adaptor 172, a fluid with or without analytes can be quickly introduced to the multiple sample surfaces. Non-specific binding of analytes to the sides of the pillars 178 is minimized as the fluid primarily contacts the top regions of the pillars 178. After the sample surfaces of the pillars 178 contact the fluids, the anti-interference adaptor 170 can remain adjacent to the chip 170 while the characteristics of the samples on the sample surfaces are detected.

External devices (not shown) such as optical devices may be used to detect chemical reactions between the material flowing through the chamber and any materials on the top surfaces of the pillars 178. For example, a light signal 180 can be directed to the samples on the surfaces of the pillars 178 and the reflected signal can be detected to determine if a reaction has occurred at the sample surface.

Figure 31A:
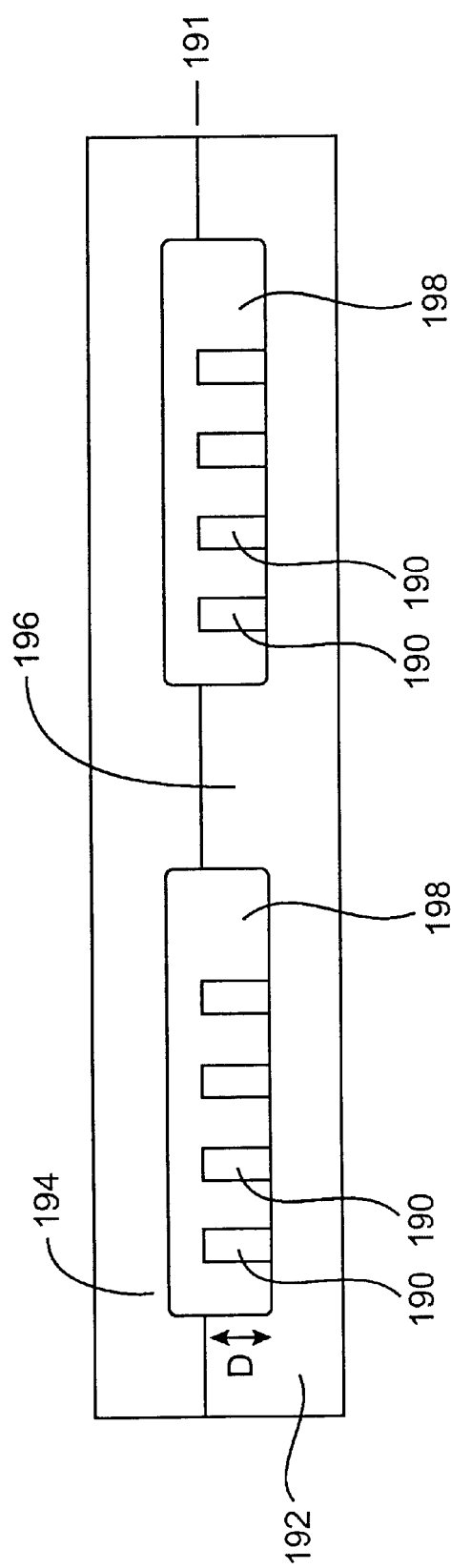
FIG. 31(a) shows a cross-sectional view of an assembly embodiment.
Figure 31B:
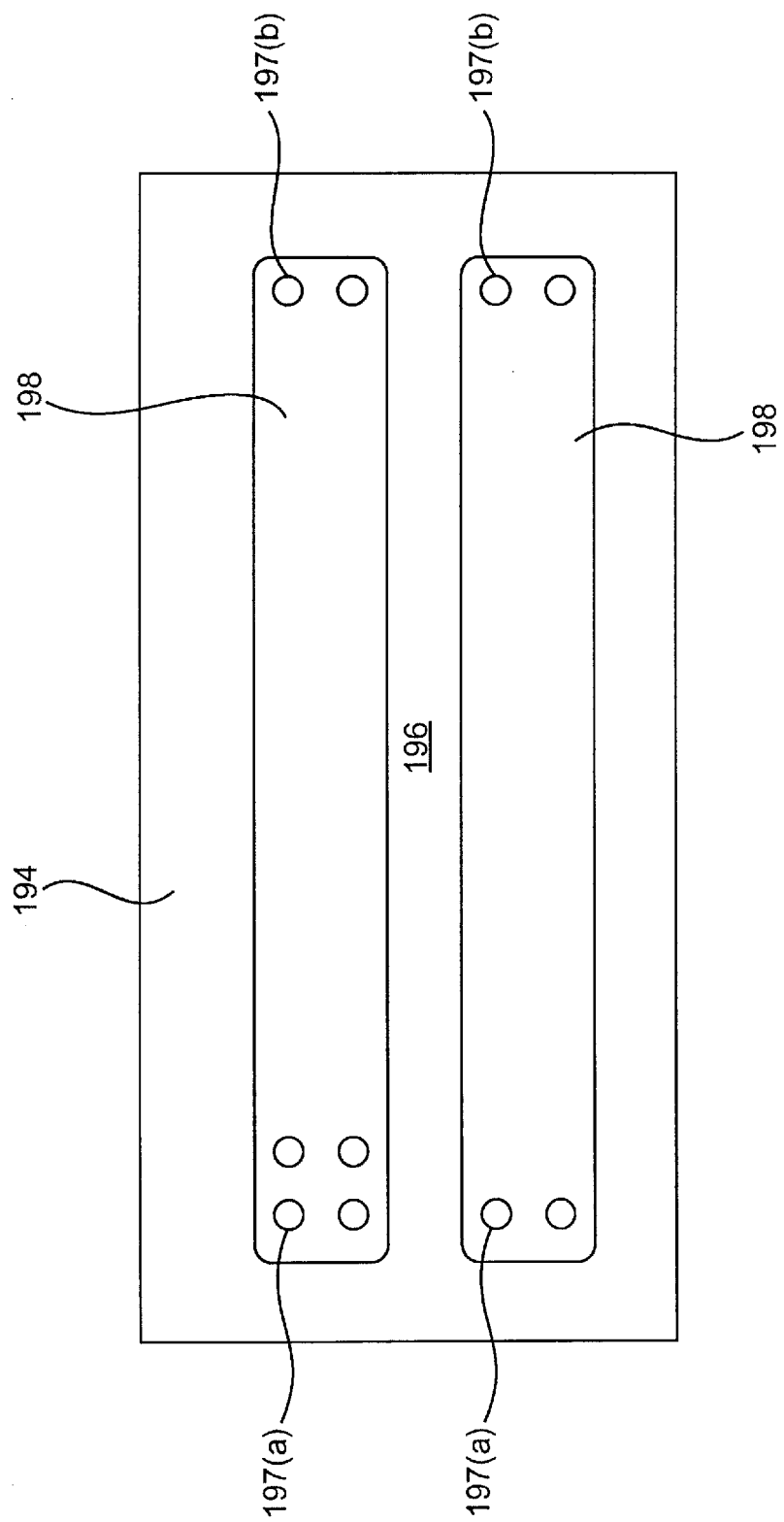
FIG. 31(b) shows a top view of the assembly embodiment shown in FIG. 31(a), with troughs being shown by invisible lines.

FIG. 31(*a*) shows another assembly embodiment. Referring to FIG. 31(*a*), this embodiment includes a chip 191 having a base 192 with troughs 198 separated by a support 196. A number of pillars 190 are on the bottom surfaces of the troughs 198. Each of the pillars 190 may have a height that is substantially equal to the depth D of the trough 198 that it is in. In other embodiments, the pillars may have a height that is less than the depth D of the trough that they are in. A cover 194 is on the base 192 of the chip 191 and the troughs 198 can contain fluids such as liquids or gases that contact the sample surfaces on the pillars 190. In this example, there are two troughs, and each trough may contain different fluids. In other embodiments, there may be more or less than two troughs. For example, in some embodiments, there may be six troughs (or more) with 250 pillars (or more) in each trough.

FIG. 31(*b*) shows a top view of the assembly embodiment shown in FIG. 31(*a*) with the sidewalls defining the troughs 198 being shown by invisible lines. Fluids may be introduced through fluid inlets 197(*a*) in the cover 194 at first ends of the troughs 198. The cover 194 may be considered a dispenser, since fluids are being dispensed onto the sample surfaces on the pillars 190. The fluids then pass through the troughs 198 to the opposite ends and pass out of fluid outlets 197(*b*) in the cover 194. In other embodiments, the fluid inlets and/or the fluid outlets may be provided in the base 192. As the fluids pass through the troughs 198, the fluids contact the top sample surfaces of the pillars 190 and any substances at those top sample surfaces. After the fluids contact the top sample surfaces of the pillars 190, the top sample surfaces may be analyzed to determine if any interactions or reactions have taken place. The analysis may take place with or without the cover 194 on the base 192.

The embodiment shown in FIGS. 31(*a*) and 31(*b*) has a number of advantages. For example, unlike some of the previously described embodiments, the pillars 190 on the chip 191 need not be aligned with holes in a dispenser. Fluids can be introduced to the top sample surfaces of the pillars 190 without a precise aligning step. Liquids or gases containing different components may contact a plurality of sample surfaces substantially simultaneously. Accordingly, procedures such as assays can be performed quickly using embodiments such as those shown in FIGS. 31(*a*) and 31(*b*).

Any of the described dispenser/sample chip combinations can be used together in a single process. For example, in one exemplary embodiment, dispensers that have passive valves (e.g., as shown in FIGS. 10–17) can be used to deposit different capture agents on the top surfaces of the pillars of the sample chips. After the capture agents are bound to the top surfaces of the pillars, dispensers such as the ones shown in FIGS. 26–30 may be used to dispense analyte containing liquids so that they contact the capture agents bound to the top surfaces of the pillars.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, any specifically described sample structure embodiments in FIGS. 2–6 may be used with the assemblies shown in FIGS. 8–31 without departing from the scope of the invention.

What is claimed is:

1. A method comprising:

a) supplying a plurality of liquids containing respectively different components to respective channels in a dispenser;

b) aligning sample surfaces on a plurality of structures on a base of a chip with the channels in the dispenser by moving at least one of the chip and the dispenser, wherein the plurality of structures comprise a plurality of pillars, and wherein the sample surfaces are at ends of the structures;

c) simultaneously dispensing the plurality of liquids in the channels onto the sample surfaces; and d) binding the different components to the sample surfaces.

2. The method of claim 1 wherein each pillar comprises a side surface including a concave portion.

3. The method of claim 1 further comprising analyzing the components on the sample surfaces after d).

4. The method of claim 1 wherein the different components are respectively different analytes or different capture agents.

5. The method of claim 1 wherein the plurality of liquids comprise a reagent.

6. The method of claim 1 wherein the plurality of liquids containing different components do not contact the base of the chip.

7. The method of claim 1 wherein the different components comprise different polypeptides or different proteins.

8. The method of claim 1 dispensing comprises:

applying a first pressure to the plurality of liquids in the channels in the dispenser to push the plurality of liquids to first passive valves in the channels;

placing the one or more sample surfaces of the chip within the channels or at ends of the channels, and engaging the dispenser with the chip;

applying a second pressure to the plurality of liquids in the channels to push the plurality of liquids past the first passive valves and into contact with the samples surfaces, the second pressure being greater than the first pressure; and applying a third pressure to the plurality of liquids in the channels, the third pressure being less than the second pressure.

9. The method of claim 1 wherein dispensing takes place without forming droplets of liquid.

10. A method comprising:

a) supplying a plurality of liquids to respective channels in a dispenser, wherein each of the channels includes a passive valve and wherein the flow of each liquid in each channel stops at the passive valve;

b) aligning sample surfaces of a plurality of structures of a sample chip with the plurality of channels, wherein each structure comprises a pillar, and wherein at least one of the sample chip and the dispenser move during aligning; and c) simultaneously contacting the sample surfaces, and the liquids in the channels while the sample surfaces are in, or are positioned at ends of, the channels.

11. The method of claim 10 wherein the method further comprises:

applying pressure to the liquid in the channel to force the liquid past the passive valve.

12. The method of claim 10 wherein the liquids within the different channels contain respectively different capture agents.

13. The method of claim 10 wherein the pillars have an aspect ratio greater than about 0.25.

14. The method of claim 10 wherein the method further comprises, after c):

allowing the sample surfaces to remain in or at the ends of the channels for a predetermined amount of time; and then separating the chip and the dispenser.

15. The method of claim 10 wherein liquids in the channels contain respectively different components.

16. The method of claim 10 wherein the method further comprises, prior to a):

binding a plurality of capture agents to the sample surfaces.

17. The method of claim 10 further comprising analyzing the samples on the sample surfaces after c).

18. The method of claim 10 wherein the chip is a first chip, and wherein the method further comprises: after c) processing the components on the sample surfaces surface separating the first chip and the dispenser;

placing a second cover chip having a plurality of passages positioned over and aligned with the sample surfaces; and transferring the processed components to an analysis device through the passages in the second cover chip.

19. The method of claim 2 wherein, after c), the dispensed liquids remain above the concave portions of the side surfaces of the pillars.

* * * * *

UNITED STATES PATENT AND TRADEMARK OFFICE
CERTIFICATE OF CORRECTION

PATENT NO. : 6,720,157 B2
DATED : April 13, 2004
INVENTOR(S) : Pierre F. Indermuhle et al.

It is certified that error appears in the above-identified patent and that said Letters Patent is hereby corrected as shown below:

Title page,
Item [56], References Cited, OTHER PUBLICATIONS, kindly insert --

PETERSEN et al., The Promise of Miniaturized Clinical Diagnostic Systems, IVDT Archive (July 1998); pp. 1-15.

DESAI et al., A MEMS Electrostatic Particle Transportation System, Sensors and Actuators A: Physical (1999), pp. 1-33.

MSIA™ Mass Spectrometric Immunoassay, Intrinsic Bioprobes, Inc., http://www.intrinsicbio.com/msia.htm, June 11, 2001, 1 page.

MAN et al., Microfabricated Capillarity-Driven Stop Valve and Sample Injector, University of Michigan, Ann Arbor, MI IEEE (1998), pp. 45-50.

McNEELY, et al., Microfluidic Devices and Systems II, SPIE – The International Society for Optical Engineering, Vol. 3877 (September 20 – 21, 1999), pp. 210-220.

DUCRÉE, et al., Topspot – A New Method for the Fabrication of Microarrays, IEEE (April 2000), pp. 317-322.

KAMISUKI, et al., A High Resolution, Electrostatically-Driven Commercial Inkjet Head, Production Engineering & Development Department, Seiko Epson Corporation, 2000, pp. 793-798.--

Signed and Sealed this

Twenty-eighth Day of December, 2004

JON W. DUDAS
*Director of the United States Patent and Trademark Office*